(12) United States Patent
Tsuda

(10) Patent No.: US 8,798,620 B2
(45) Date of Patent: Aug. 5, 2014

(54) METHODS AND SYSTEMS FOR ESTIMATING AVAILABLE CAPACITY OF A BASE STATION WITHIN A WIRELESS COMMUNICATIONS NETWORK

(75) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 12/783,150

(22) Filed: May 19, 2010

(65) Prior Publication Data
US 2010/0304742 A1 Dec. 2, 2010

(30) Foreign Application Priority Data

May 26, 2009 (JP) ................. P2009-126951
Feb. 22, 2010 (JP) ................. P2010-036147

(51) Int. Cl.
*H04W 4/00* (2009.01)
(52) U.S. Cl.
USPC .............. 455/434; 455/435.2; 455/414.2; 455/452.2; 455/437
(58) Field of Classification Search
USPC ............... 455/452.2, 434, 414.2, 435.2, 437
See application file for complete search history.

(56) References Cited

U.S. PATENT DOCUMENTS

| | | | | |
|---|---|---|---|---|
| 6,542,562 | B1* | 4/2003 | Ostberg et al. | 375/350 |
| 6,721,557 | B1* | 4/2004 | Ritter | 455/423 |
| 7,710,922 | B2* | 5/2010 | Lundh et al. | 370/331 |
| 7,787,412 | B2* | 8/2010 | Vadgama et al. | 370/320 |
| 2001/0012301 | A1* | 8/2001 | Yi et al. | 370/439 |
| 2002/0041580 | A1* | 4/2002 | Shoji et al. | 370/335 |
| 2003/0179814 | A1* | 9/2003 | Juntti et al. | 375/148 |
| 2004/0087343 | A1* | 5/2004 | Lucidarme et al. | 455/562.1 |
| 2004/0161020 | A1* | 8/2004 | Mathew et al. | 375/149 |
| 2004/0242240 | A1* | 12/2004 | Lin | 455/456.3 |
| 2005/0070319 | A1* | 3/2005 | Pedersen | 455/515 |
| 2005/0107090 | A1* | 5/2005 | Hosein | 455/453 |
| 2005/0148319 | A1* | 7/2005 | Himeno | 455/406 |
| 2006/0025115 | A1* | 2/2006 | Roy | 455/414.1 |
| 2007/0081459 | A1* | 4/2007 | Segel et al. | 370/230 |
| 2007/0081481 | A1* | 4/2007 | Cai et al. | 370/312 |
| 2007/0109192 | A1* | 5/2007 | Riley et al. | 342/451 |
| 2007/0177535 | A1* | 8/2007 | Zalio | 370/328 |
| 2008/0070587 | A1* | 3/2008 | Hirvonen et al. | 455/453 |
| 2008/0085707 | A1* | 4/2008 | Fadell | 455/435.3 |
| 2008/0096566 | A1* | 4/2008 | Brunner et al. | 455/437 |
| 2008/0153506 | A1* | 6/2008 | Yin et al. | 455/452.2 |
| 2008/0279114 | A1* | 11/2008 | Roy | 370/252 |
| 2009/0017757 | A1* | 1/2009 | Koga et al. | 455/62 |
| 2009/0017823 | A1* | 1/2009 | Sachs et al. | 455/437 |
| 2009/0022109 | A1* | 1/2009 | Hashimoto | 370/335 |
| 2009/0067370 | A1* | 3/2009 | Kim et al. | 370/328 |
| 2010/0234042 | A1* | 9/2010 | Chan et al. | 455/453 |
| 2011/0199897 | A1* | 8/2011 | Shin et al. | 370/230 |

FOREIGN PATENT DOCUMENTS

JP  2008-298484  12/2008

* cited by examiner

*Primary Examiner* — Sharad Rampuria
*Assistant Examiner* — Mong-Thuy Tran
(74) *Attorney, Agent, or Firm* — Finnegan, Henderson, Farabow, Garrett & Dunner, LLP

(57) ABSTRACT

Systems, methods, and computer program products are provided for calculating an indicator of a quality of communication within a wireless communication access network and for estimating the available capacity of a base station within the wireless communication access network. In one exemplary embodiment, a method comprises receiving an indication, generated by a mobile terminal, of the quality of communication between the base station and the mobile terminal, and estimating the available capacity of the base station based on the received indication.

27 Claims, 16 Drawing Sheets

METHODS AND SYSTEMS FOR ESTIMATING AVAILABLE CAPACITY OF A BASE STATION WITHIN A WIRELESS COMMUNICATIONS NETWORK

BACKGROUND

1. Technical Field

The present invention relates to a method, a system, a mobile terminal and a computer program product.

2. Description of the Related Art

In Japan, a 3G mobile phone service called Third Generation was started in 2002. At first, exchange of small packets such as voice and mail was the main application. However, with the introduction of High Speed Downlink Packet Access (HSDPA) and the like, download of larger packets, such as download of a music file or watching of a shared video, has come to be performed.

Furthermore, since a communication infrastructure can be structured cheaply and also since a user preference is shifting to packet transmission, shift to IP core network using IP Multimedia Subsystem (IMS) is taking place.

However, although it is a well-known fact that a fixed network typified by the Internet has grown into a communication infrastructure indispensable to life, there are many issues relating to ensuring of security, stable Quality of Service (QoS), and the like. Thus, Next Generation Network (NGN) aims to ensure security and stable QoS by introducing IMS standardized by the Third Generation Partnership Project (3GPP). Furthermore, realization of Fixed Mobile Convergence (FMC) which uses the same IMS method and which enables to seamlessly use a mobile network and a fixed network is anticipated.

Furthermore, in recent years, a mobile phone with Global Positioning System (GPS) has become widespread. Also, a mobile phone compliant with a plurality of wireless access methods and the introduction of a mechanism allowing a user to select a wireless access method in accordance with his/her preference are desired in the future. Additionally, JP-A-2008-298484 discloses a mobile terminal with GPS.

A user preference includes preference relating to communication cost and preference relating to communication speed. For example, there may be a user who prefers high communication speed to low communication cost and a user who prefers low communication cost to high communication speed. The communication speed here is dependent on a wireless status (available wireless capacity) of a user. Accordingly, a technology of grasping the wireless status changing every moment becomes important.

In light of the foregoing, it is desirable to provide a method, a system, a mobile terminal and a computer program product which are novel and improved, and which are for grasping the wireless status of the wireless communication device.

SUMMARY

In one embodiment, a method is provided for estimating an available capacity of a base station within a wireless communication access network. The method comprises receiving an indication, generated by a mobile terminal, of the quality of communication between the base station and the mobile terminal, and estimating the available capacity of the base station based on the received indication.

In another embodiment, a system is provided for estimating an available capacity of a base station within a wireless communication access network. The system comprises a communication unit for receiving an indication, generated by a mobile terminal, of the quality of communication between the base station and the mobile terminal, and a capacity estimation unit for estimating the available capacity of the base station based on the received indication.

In another embodiment, a mobile terminal comprises a correlation detection unit for calculating a correlation output based on signals received by the mobile terminal, an indicator calculation unit for calculating, using the correlation output, an indication of the quality of communication between a base station and the mobile terminal, and a communication unit for transmitting, to the base station, the indication of the quality of communication is provided.

In another embodiment, a method is provided for estimating an available capacity of a base station within a wireless communication access network. The method comprises receiving correlation outputs, generated by a mobile terminal, of a plurality of scrambling codes forming a specific scrambling code group, calculating, based on the received correlation outputs, an indication of the quality of communication between the base station and the mobile terminal, and estimating the available capacity of the base station based on the calculated indication of the quality of communication.

In another embodiment, a tangible computer-readable medium is provided. The computer-readable medium includes program instructions for performing, when executed by a processor, a method comprising calculating a correlation output based on signals received by a mobile terminal, calculating, using the correlation output, an indication of the quality of communication between a base station and the mobile terminal, and transmitting, to the base station, the indication of the quality of communication.

In another embodiment, a mobile terminal comprises a subcarrier rate detection unit for calculating an indication of the quality of communication between a base station and the mobile terminal using a detected ratio of a number of subcarriers not used as a communication resource among a total number of subcarriers available as a communication resource, and a communication unit for transmitting, to the base station, the indication of the quality of communication is provided.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of several further features disclosed below in the detailed description.

DETAILED DESCRIPTION OF THE EMBODIMENTS

Figure 1:
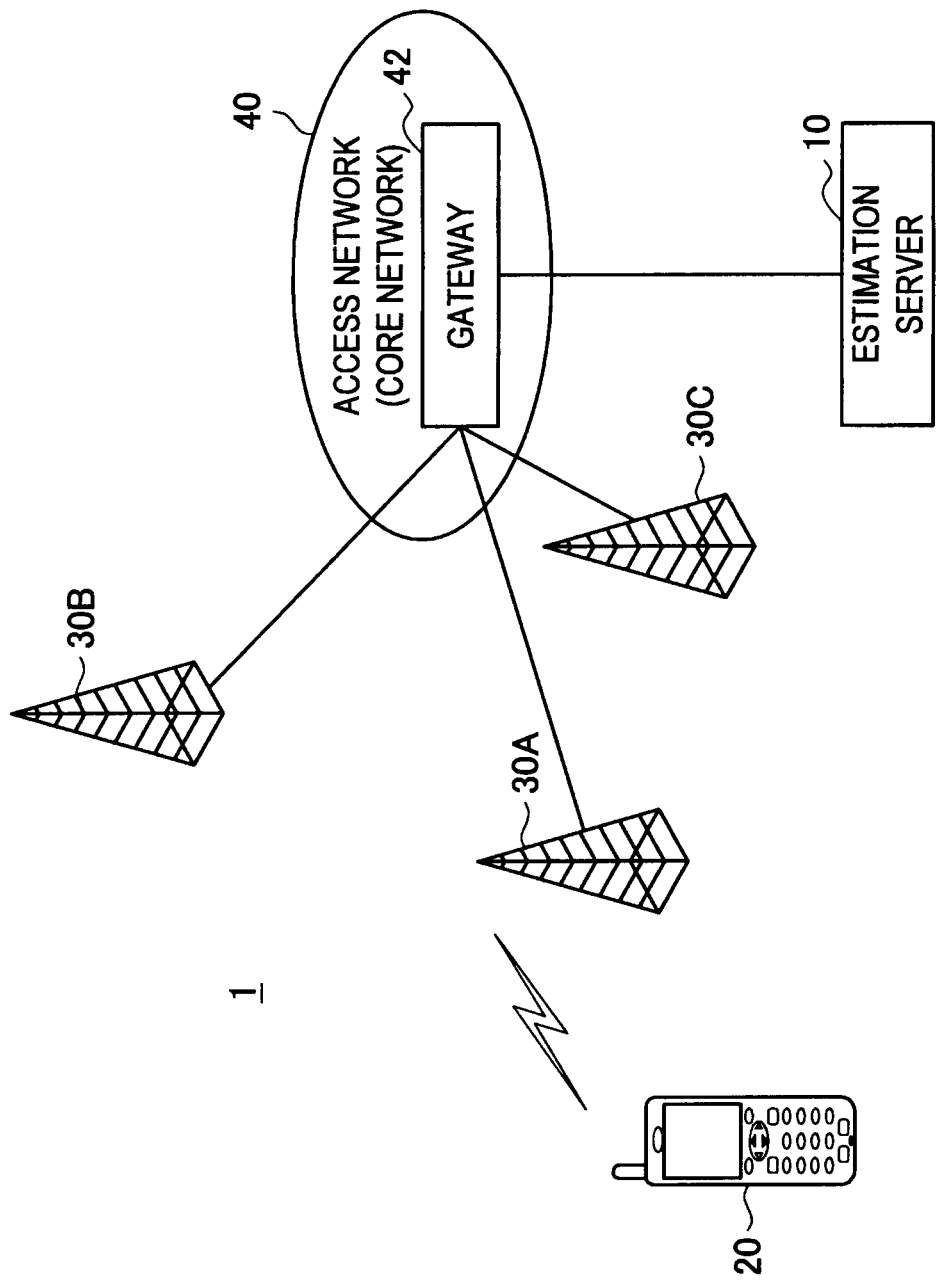
FIG. 1 is an explanatory diagram showing a first configuration example of a wireless communication system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Additionally, in this specification and drawings, a plurality of structural elements having substantially the same functional configuration are sometimes distinguished from each other by a different alphabet letter added to a same numeral. For example, a plurality of structures having substantially the same functional configuration are distinguished from each other as necessary by being referred to as base stations 30A, 30B and 30C. However, in case it is not necessary to distinguish between a plurality of structural elements having substantially the same functional configuration, only a same numeral is added thereto. For example, in case it is not particularly necessary to distinguish between the base stations 30A, 30B and 30C, they will be collectively referred to as the base stations 30.

Furthermore, "DETAILED DESCRIPTION OF THE EMBODIMENTS" will be described in the order shown below.

1. Configuration of Wireless Communication System
1-1. First Configuration Example
1-2. Second Configuration Example
1-3. Third Configuration Example
2. Hardware Configuration of Mobile Terminal
3. Functional Configuration of Mobile Terminal
3-1. First Configuration Example
3-2. Second Configuration Example
3-3. Third Configuration Example
3-4. Fourth Configuration Example
3-5. Fifth Configuration Example
4. Operation of Mobile Terminal
5. Configuration of Estimation Server
6. Operation of Estimation Server
6-1. First Operation Example
6-2. Second Operation Example
6-3. Third Operation Example
6-4. Fourth Operation Example
7. Conclusion

1. CONFIGURATION OF WIRELESS COMMUNICATION SYSTEM

First, referring to FIGS. 1 to 3, first to third configuration examples of a wireless communication system, which is an embodiment of the present invention, will be described.

1-1. First Configuration Example

FIG. 1 is an explanatory diagram showing a wireless communication system 1 of a first configuration example. As shown in FIG. 1, the wireless communication system 1 according to the first configuration example includes an estimation server 10, a mobile terminal 20, a plurality of base stations 30A to 30C, and an access network 40.

The access network 40 includes a core network of a telecommunications carrier, and a line connecting the core network and the base station 30. The base station 30 can communicate with the estimation server 10 via a gateway 42 included in the access network 40.

The base station 30 controls the communication by the mobile terminal 20. For example, the base station 30 relays data received from the mobile terminal 20 to an addressed destination, and when data addressed to the mobile terminal 20 is received, transmits the data to the mobile terminal 20. Furthermore, the base station 30 can communicate with the mobile terminal 20 by using wireless multiple access such as frequency division multiple access (FDMA), time division multiple access (TDMA), and code division multiple access (CDMA). The code division multiple access will be briefly described in the following.

According to the code division multiple access, 512 types of scrambling codes are defined, and any of the scrambling codes is assigned to each base station 30. The base station 30 frequency-spreads a transmission signal by a spreading code (for example, a channelization code) in accordance with the type of the transmission signal or the mobile terminal 20, and further frequency-spreads the transmission signal by using the assigned scrambling code and transmits the same. Additionally, the type of the transmission signal may be a common pilot channel (CPICH), a primary common control physical channel (P-CCPCH), a dedicated physical channel (DPCH), a synchronization channel (SCH), or the like.

Furthermore, the SCH includes a primary SCH and a secondary SCH. The primary SCH and the secondary SCH are arranged at the beginning portion of each of 15 slots configuring one frame, and the primary SCH is spread by a $C_{PSC}$ (Primary Synchronization Code) and the secondary SCH is spread by a $C_{SSC}$ (Secondary Synchronization Code).

There are 16 types of $C_{SSC}$, and 64 combination patterns are prepared to be assigned to the 15 slots. Each base station 30 is assigned with any of the 64 patterns, and the base station 30 frequency-spreads and transmits the secondary SCH in each slot according to the assigned pattern. Additionally, the 512 types of scrambling codes are divided into 64 groups, and each group is associated with any of the 64 $C_{SSC}$ combination patterns.

The mobile terminal 20 can communicate various data with other device via the base station 30. The various data may be audio data such as music, a lecture, a radio program, or the like, image data such as a motion picture, a television program, a video program, a photograph, a document, a painting, a diagram, or the like, a game, software, or the like.

Furthermore, in case of the mobile terminal 20 communicating with the base station 30A as shown in FIG. 1, the mobile terminal 20 calculates an indicator of a quality of communication, the value of which can be used by the estimation server 10, along with location identification information for identifying the current location of the mobile terminal 20, to generate an estimate of available capacity of the base station 30A. The detailed function of such mobile terminal 20 will be described in "3. Functional Configuration of Mobile Terminal."

Additionally, although the mobile terminal 20 is shown as an example of a wireless communication device in FIG. 1, the wireless communication device is not limited to such example. For example, the wireless communication device may be an information processing apparatus such as a personal computer (PC), a home video processing device (a DVD recorder, a video cassette recorder, or the like), a personal digital assistant (PDA), a home game machine, a home appliance, or the like. Also, the wireless communication device may be an information processing apparatus such as a mobile phone, a Personal Handyphone System (PHS), a portable audio playback device, a portable video processing device, a portable game machine, or the like.

The estimation server 10 receives the indicator of the quality of communication and the location identification information from the mobile terminal 20 via the base station 30 and the gateway 42. The estimation server 10 can estimate the available capacity of the base station 30 by using the indicator of the quality of communication and the location identification information that are received. The detailed configuration and operation of such estimation server 10 will be described later.

1-2. Second Configuration Example

Figure 2:
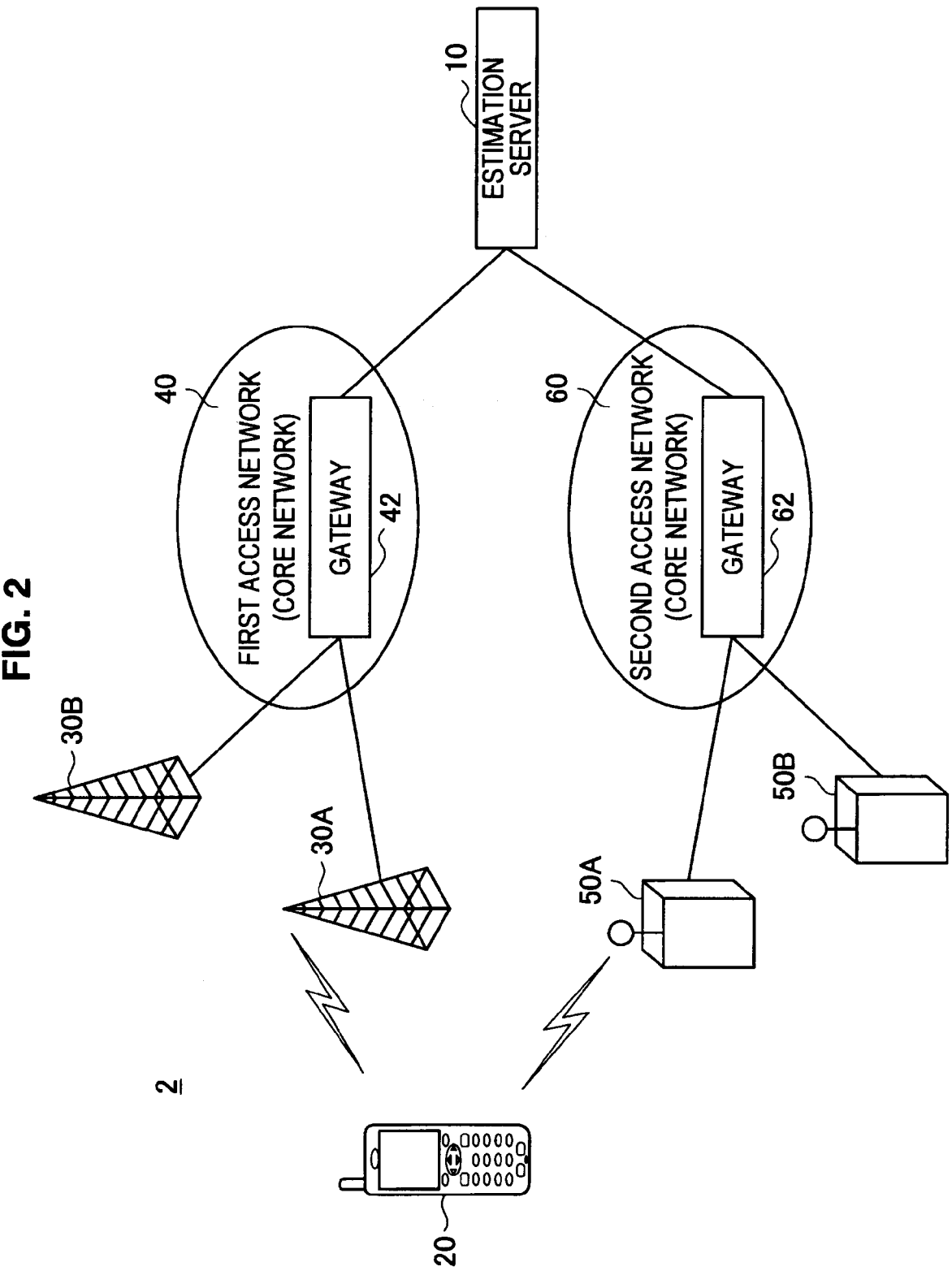
FIG. 2 is an explanatory diagram showing a second configuration example of the wireless communication system.

FIG. 2 is an explanatory diagram showing a wireless communication system 2 of a second configuration example. As shown in FIG. 2, the wireless communication system 2 according to the second configuration example includes the estimation server 10, the mobile terminal 20, a plurality of first base stations 30A and 30B, a first access network 40, a plurality of second base stations 50A and 50B, and a second access network 60.

The first base station 30 is connected with the first access network 40, and the second base station 50 is connected with the second access network 60. Also, the estimation server 10 is connected with the first access network 40 via a gateway 42 arranged in a core network to which the first base station 30 belongs, and is connected with the second access network 60 via a gateway 62 arranged in a core network to which the second base station 50 belongs.

This wireless communication system 2 according to the second configuration example allows the mobile terminal 20 to register location with the first base station 30A and the second base station 50A belonging to different core networks. Accordingly, the mobile terminal 20 can transmit the indicator of the quality of communication and the location identification information to the estimation server 10 via the gateway 42 or the gateway 62.

The estimation server 10 estimates the available capacity of the first base station 30A and the available capacity of the second base station 50A by using the indicator of the quality of communication and the location identification information that are received. Furthermore, as will be described in detail later, the estimation server 10 can select which of the first access network 40 and the second access network 60 is suitably used for the mobile terminal 20.

1-3. Third Configuration Example

Figure 3:
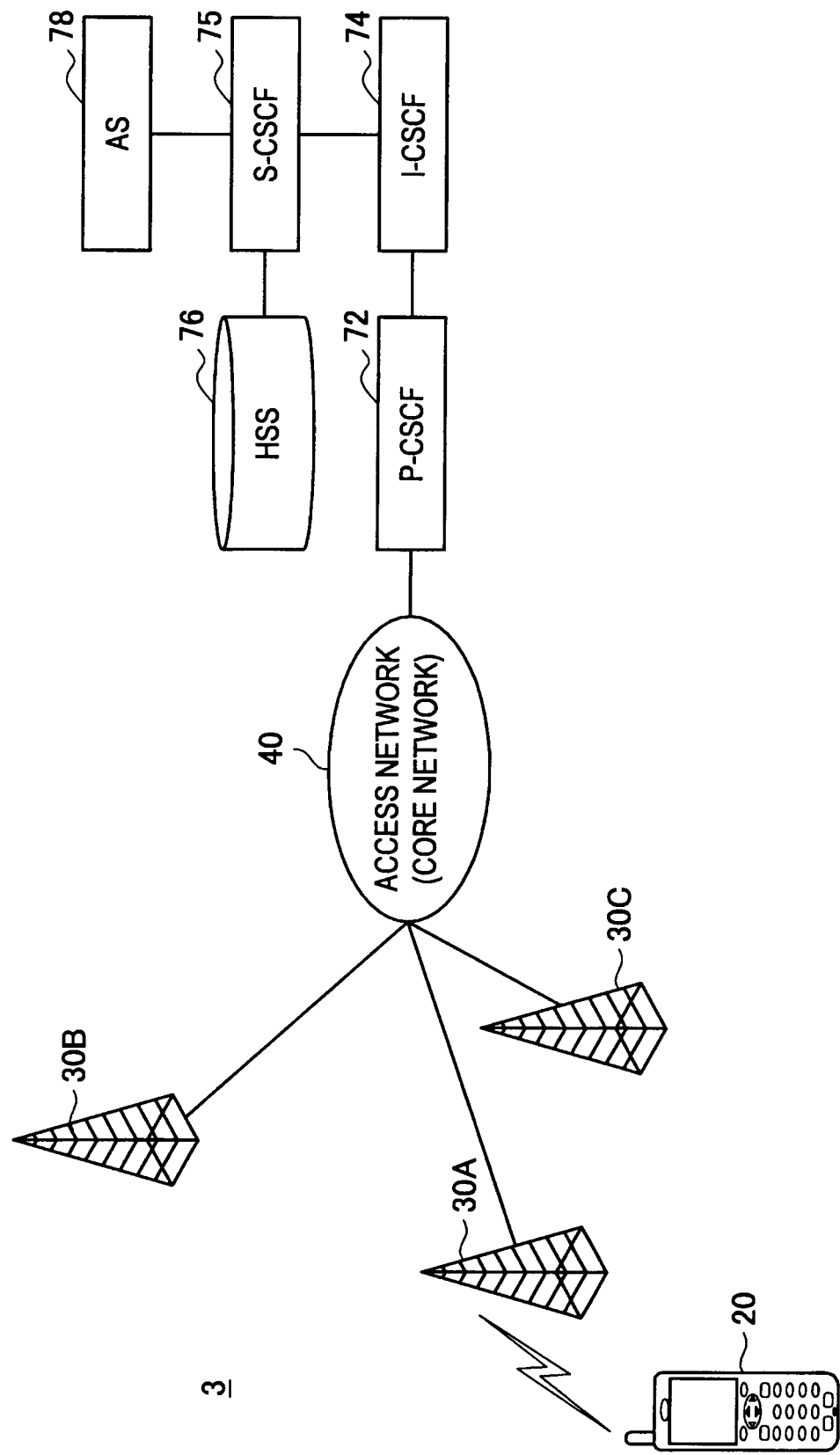
FIG. 3 is an explanatory diagram showing a third configuration example of the wireless communication system.

FIG. 3 is an explanatory diagram showing a wireless communication system 3 of a third configuration example. As shown in FIG. 3, the wireless communication system 3 according to the third configuration example is configured based on the IMS. Specifically, the wireless communication system 3 according to the third configuration example includes the mobile terminal 20, a plurality of base stations 30A to 30C, the access network 40, a proxy-call session control function (P-CSCF) 72, an interrogating-CSCF (I-CSCF) 74, a serving-CSCF (S-CSCF) 75, a home subscriber server (HSS) 76, and an application server (AS) 78.

This wireless communication system 3 according to the third configuration example allows the mobile terminal 20 to perform communication via the base station 30 according to the IMS. Furthermore, according to the wireless communication system 3, the S-CSCF 75, the HSS 76 and the AS 78, for example, function as the estimation server 10.

2. HARDWARE CONFIGURATION OF MOBILE TERMINAL

Next, a hardware configuration of the mobile terminal 20 will be described with reference to FIG. 4.

Figure 4:
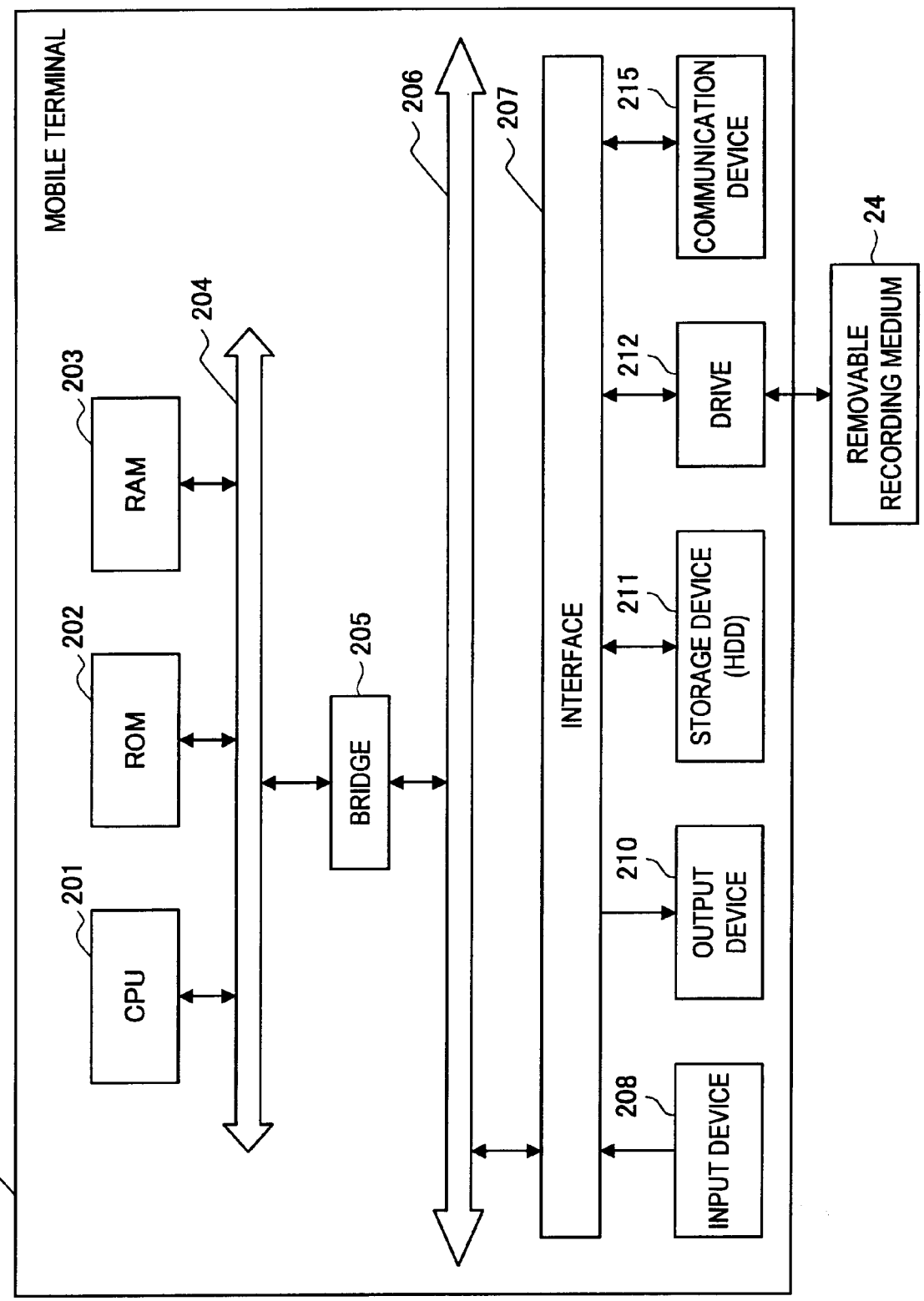
FIG. 4 is a block diagram showing a hardware configuration of a mobile terminal.

FIG. 4 is a block diagram showing the hardware configuration of the mobile terminal 20. The mobile terminal 20 includes a central processing unit (CPU) 201, a read only memory (ROM) 202, a random access memory (RAM) 203, and a host bus 204. Furthermore, the mobile terminal 20 includes a bridge 205, an external bus 206, an interface 207, an input device 208, an output device 210, a storage device (HDD) 211, a drive 212, and a communication device 215.

The CPU 201 functions as an arithmetic processing device and a control device, and controls the entire operations of the mobile terminal 20 according to various programs. Furthermore, the CPU 201 may be a microprocessor. The ROM 202 stores programs, arithmetic parameters or the like to be used by the CPU 201. The RAM 203 temporarily stores a program to be used by the CPU 201 in its execution, parameters that change appropriately in the execution, or the like. These are interconnected through the host bus 204 configured from a CPU bus or the like.

The host bus 204 is connected to the external bus 206 such as a peripheral component interconnect/interface (PCI) bus through the bridge 205. Moreover, the host bus 204, the bridge 205 and the external bus 206 do not necessarily have to be configured separately, and the functions may be implemented in a single bus.

The input device 208 is configured from input means to be used by a user to input information, such as a mouse, a keyboard, a touch panel, a button, a microphone, a switch or a lever, an input control circuit that generates an input signal based on the input by the user and outputs the input signal to the CPU 201, and the like. The user of the mobile terminal 20 can input various types of data to the mobile terminal 20 or issue an instruction for a processing operation by operating this input device 208.

The output device 210 includes, for example, a display device such as a liquid crystal display (LCD) device, an organic light emitting diode (OLED) device, or a lamp. Furthermore, the output device 210 includes an audio output device such as a speaker, a head phone, or the like. The output device 210 outputs reproduced content, for example. Specifically, the display device displays various types of information of reproduced image data or the like in the form of text or image. For its part, the audio output device converts reproduced audio data or the like to sound and outputs the sound.

The storage device 211 is a data storage device configured as an example of a storage unit of the mobile terminal 20. The storage device 211 may include a storage medium, a recording device for recording data on the storage medium, a read device for reading data out of the storage medium, a deletion device for deleting data recorded on the storage medium, or the like. The storage device 211 is configured from a hard disk drive (HDD), for example. The storage device 211 drives a hard disk, and stores programs to be executed by the CPU 201 and various types of data.

The drive 212 is a reader/writer for the storage medium, and is built in or externally attached to the mobile terminal 20. The drive 212 reads out information stored in an attached removable recording medium 24 such as a magnetic disk, an optical disk, a magneto-optical disk, a semiconductor memory or the like, and outputs the information to the RAM 203.

The communication device 215 is an interface for communicating with the outside, for example. The communication device 215 may include a function of communicating with the base station 30 and a function of communicating with a GPS.

3. FUNCTIONAL CONFIGURATION OF MOBILE TERMINAL

Next, a mobile terminal 20-1 according to a first configuration example will be described with reference to FIG. 5, a mobile terminal 20-2 according to a second configuration example will be described with reference to FIG. 6, a mobile terminal 20-3 according to a third configuration example will be described with reference to FIG. 7, a mobile terminal 20-4 according to a fourth configuration example will be described with reference to FIG. 8, and a mobile terminal 20-5 according to a fifth configuration example will be described with reference to FIG. 9.

3-1. First Configuration Example

Figure 5:
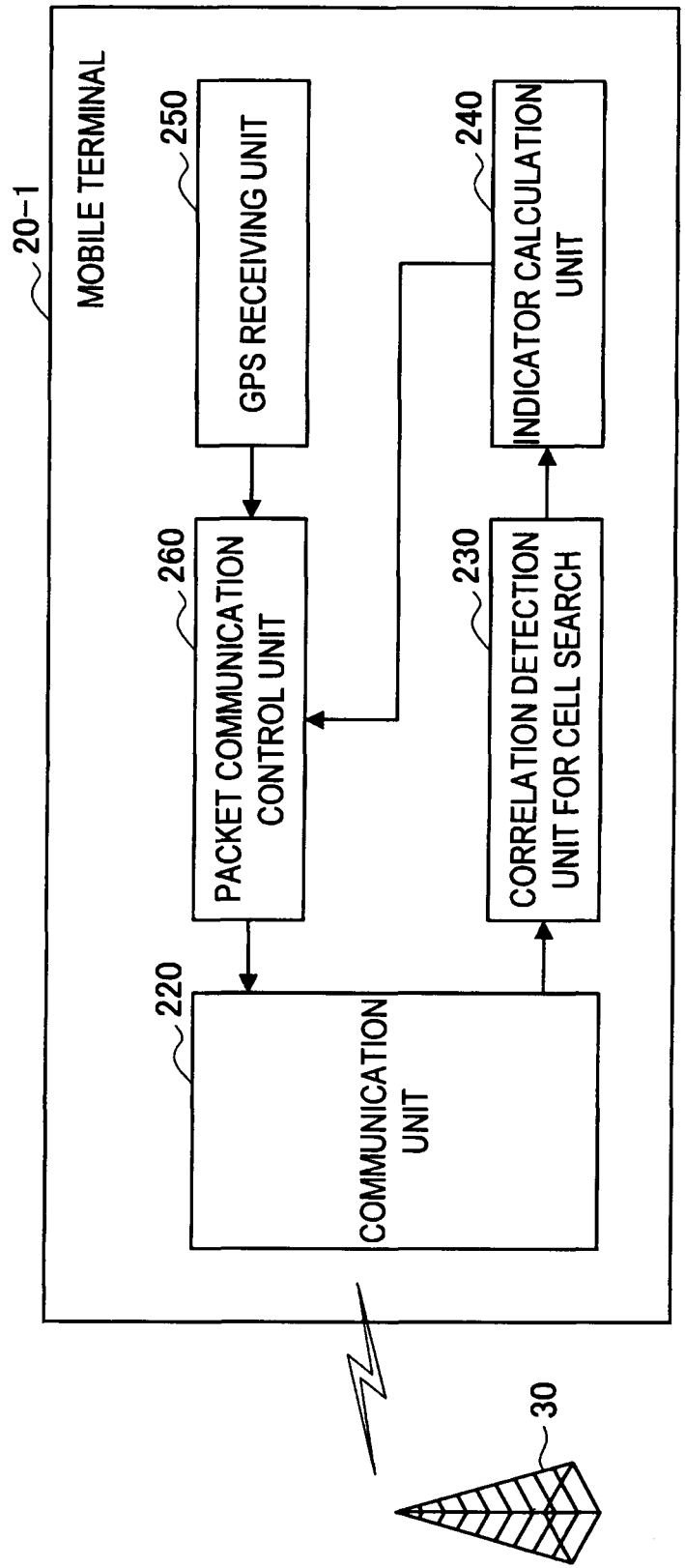
FIG. 5 is a functional block diagram showing a mobile terminal according to a first configuration example.

FIG. 5 is a functional block diagram showing the mobile terminal 20-1 according to the first configuration example. As shown in FIG. 5, the mobile terminal 20-1 according to the first configuration example includes a communication unit 220, a correlation detection unit 230 for cell search, an indicator calculation unit 240, a GPS receiving unit 250, and a packet communication control unit 260. The mobile terminal 20-1 according to the first configuration is applicable to the wireless communication system 1 according to the first configuration example, for example.

The communication unit 220 is an interface to the base station 30, and has a function of a receiving unit for receiving a wireless signal transmitted from the base station 30 and a function of a transmitting unit for transmitting a wireless signal to the base station 30. Additionally, this configuration example assumes a case where the communication unit 220 receives, from the base station 30, a wireless signal that is frequency-spread according to CDMA. Furthermore, wireless signals received by the communication unit 220 from k base stations 30 are expressed by the following formula 1.

[Equation 1]

$$r(t) = \sum_{k=0}^{K-1} \sqrt{2S_{k,0}}\, \xi_k(t) c_{k,0}(t-\tau_k) d_{k,0}(t-\tau_k) + \\ \sum_{k=0}^{K-1} \sqrt{2S_{k,1}}\, u(t)\xi_k(t) c_{k,1}(t-\tau_k) d_{k,1}(t-\tau_k) + \\ \sum_{k=0}^{K-1} \xi_k(t) \sum_{i=2}^{C+1} \sqrt{2S_{k,i}}\, c_{k,i}(t-\tau_k) d_{k,i}(t-\tau_k) + \\ \sum_{k=0}^{K-1} \sqrt{2S_{k,1}}\, [1-u(t)]\xi_k(t)[c_{psc}(t-\tau) + \\ c_{ssc,i(s,m)}(t-\tau_k)] + w(t)$$

(Formula 1)

$S_{k,0}$, $c_{k,0}$, $d_{k,0}$: Transmission power of CPICH, spreading code waveform, data modulated signal waveform $S_{k,1}$, $C_{d,1}$, $d_{k,1}$: Transmission power of Primary-CCPCH, spreading code waveform, data modulated signal waveform $S_{k,i}$: Transmission power of DPCH spread by an i-th channelization code from k-th base station The first term of the right-hand side of formula 1 indicates the CPICHs from the k base stations 30, the second term indicates the Primary-CCPCHs from the k base stations, the third term indicates the DPCHs in C channels, the fourth term indicates the SCHs, and the fifth term indicates a background noise. Furthermore, $C_{k,0}$ is a composite spreading code, and is spread by a scrambling code $C_{SC,k}$ and a channelization code $C_{ch,0}$.

The correlation detection unit 230 for cell search (correlation detection unit) can identify a scrambling code having the highest correlation output, i.e. the base station 30 with the smallest propagation loss, by performing a three-step cell search based on a wireless signal received by the communication unit 220. In the following, the there-step cell search will be briefly described.

First, the correlation detection unit 230 for cell search detects a correlation between a received signal and the $C_{psc}$, and detects a timing of receiving a primary SCH (first step). Then the correlation detection unit 230 for cell search detects a pattern having the highest correlation with the received signal among the 64 $C_{SSC}$ combination patterns by using the timing of receiving a primary SCH detected in the first step (second step). As a result, a scrambling code group is identified, and frame-based synchronization is secured. Then the correlation detection unit 230 for cell search detects the correlation between the received signal and each of 8 types of scrambling codes included in the identified scrambling code group, and identifies a scrambling code with the highest correlation output (third step). Additionally, the Primary-CCPCH and the DPCH are spread by a different channelization code, and thus they remain frequency-spread.

The indicator calculation unit 240 (calculation unit) uses the correlation output obtained in the process of the cell search by the correlation detection unit 230 for cell search to calculate an indicator of the quality of communication for estimating the available capacity of the base station 30. An example of calculation by the indicator calculation unit 240 will be described below.

In the third step of the cell search, the CPICH, the Primary-CCPCH, and the DPCH are detected as signals that are multiplexed while still being spread, with regard to the correlation outputs for the other 7 types of scrambling codes. Here, taking the ratio of the chip rate of the spreading code to the symbol rate as a spreading factor (SF), an average value of 1/SF is detected as the correlation output due to the spreading.

Here, when the number of DPCHs (i.e. the number of users of the base station 30) to be multiplexed grows, or when the number of HS-DSCHs (i.e. the number of high-speed downlink shared channels to be shared by a plurality of users in HSDPA) grows, the correlation output is greatly increased in spite of each DPCH or each HS-DSCH being spread, and thus, the correlation outputs for the other 7 types of scrambling codes are considered to become high. Similarly, when the interference from other cell grows, the interference wave from such other cell also increases the correlation output, and thus, the correlation outputs for the other 7 types of scrambling codes are also considered to become high. Accordingly, when the correlation output for the identified scrambling code is taken as a and the minimum value of the correlation outputs for the other 7 types of scrambling codes is taken as b, b/a is considered to become larger as the available capacity of the base station 30 decreases due to the increase in the number of users of the base station 30 or as the interference from other cell grows.

Thus, the indicator calculation unit 240 calculates the above b/a as the indicator of the quality of communication for estimating the available capacity. Additionally, an indicator is effective as the indicator of the quality of communication as long as it indicates the relationship between the highest correlation output and other correlation output, and thus the indicator of the quality of communication is not limited to the above b/a. For example, the indicator calculation unit 24 may calculate c/a as the indicator of the quality of communication, where c is an average value of the correlation outputs for the other 7 types of scrambling codes.

The GPS receiving unit 250 functions as an acquisition unit for acquiring location information indicating the current location of the mobile terminal 20 by receiving and decoding a GPS signal transmitted from a satellite. Additionally, the location information obtained by the GPS receiving unit 250 corresponds to a subordinate concept of the location identification information enabling the identification of a location.

The packet communication control unit 260 transmits the indicator of the quality of communication obtained by the indicator calculation unit 240 and the location identification information obtained by the GPS receiving unit 250 to the estimation server 10 outside the core network to which the base station 30 belongs via the gateway 42 of the core network. As a result, the estimation server 10 can estimate the available capacity of the base station 30, for example, based on the indicator of the quality of communication and the location identification information.

3-2. Second Configuration Example

Figure 6:
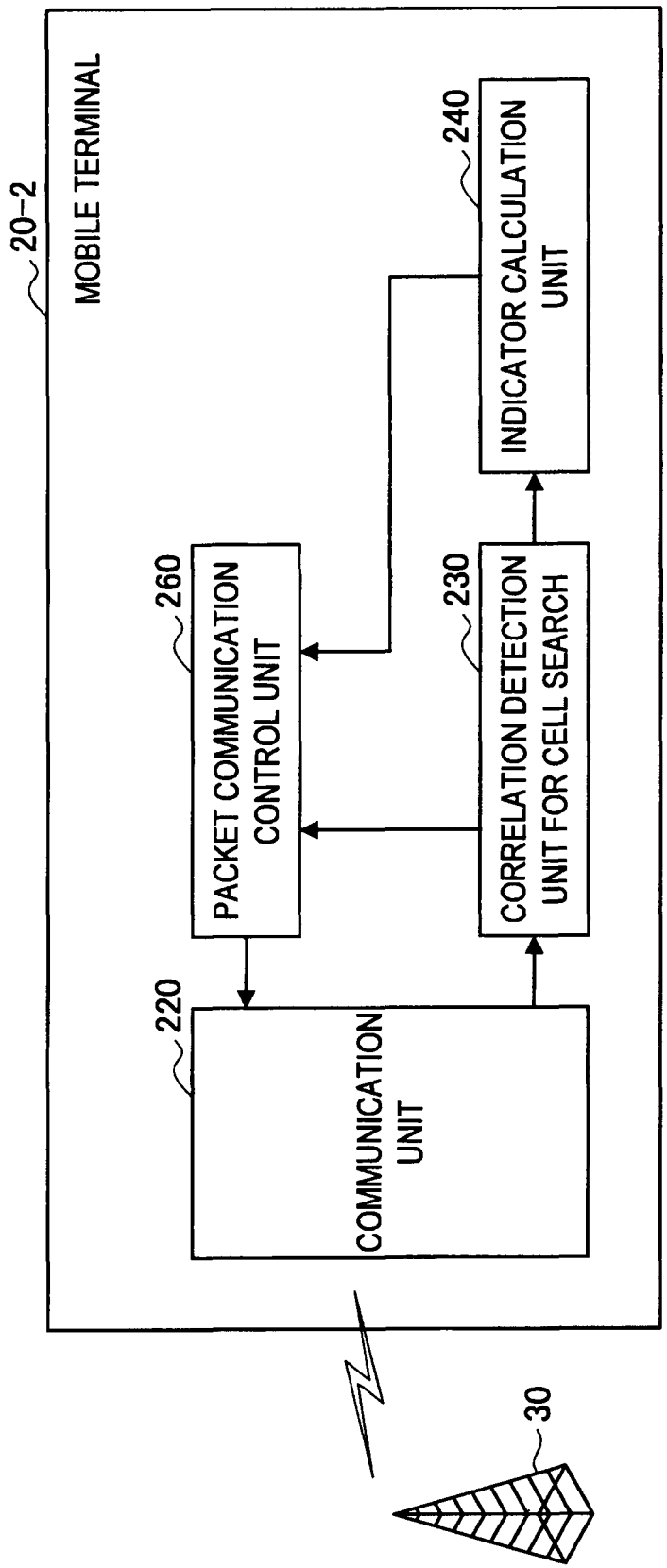
FIG. 6 is a functional block diagram showing a mobile terminal according to a second configuration example.

FIG. 6 is a functional block diagram showing a mobile terminal 20-2 according to the second configuration example. As shown in FIG. 6, the mobile terminal 20-2 according to the second configuration example includes the communication unit 220, the correlation detection unit 230 for cell search, the indicator calculation unit 240, and the packet communication control unit 260. The mobile terminal 20-2 according to the second configuration is applicable the wireless communication system 1 according to the first configuration example, for example.

The correlation detection unit 230 for cell search performs the three-step cell search as with the first configuration example, and the indicator calculation unit 240 calculates the indicator of the quality of communication based on the correlation output for each scrambling code obtained in the process of the three-step cell search.

Furthermore, during the initial cell search and neighbouring cell search at the time of intermittent reception, the mobile terminal 20-2 is provided with scrambling codes of the neighbouring cells and the timing difference by a broadcast channel (BCH) or a paging channel (PCH).

Thus, by performing correlation detection for each of scrambling codes assigned to the neighbouring cells, the correlation detection unit 230 for cell search can obtain a correlation output for each of the plurality of scrambling codes as a reception intensity from each of a plurality of base stations 30.

Here, the combination of the reception intensities from the plurality of base stations 30 is different depending on the location of the mobile terminal 20-2. That is, since the location of the mobile terminal 20-2 can be identified based on the reception intensity from each of the plurality of base stations 30, the reception intensity from each of the plurality of base stations 30 can be used as the location identification information. Additionally, a concrete method of location estimation based on the reception intensity from each of the plurality of base stations 30 will be described in "5. Configuration of Estimation Server."

The packet communication control unit 260 transmits the indicator of the quality of communication obtained by the indicator calculation unit 240 and the reception intensity from each of the plurality of base stations 30 obtained by the correlation detection unit 230 for cell search as the location identification information to the estimation server 10 outside the core network to which the base stations 30 belongs via the gateway 42 of the core network. As a result, the estimation server 10 can estimate the available capacity of the base stations 30, for example, based on the indicator of the quality of communication and the location identification information.

3-3. Third Configuration Example

Recently, Long Term Evolution (LTE) designed to increase the packet transmission/reception rate of a 3G mobile phone was developed, and the service is planned to start around 2010. LTE employs OFDM for downlink, SC (Single Carrier)-FDM for uplink, and further employs MIMO (Multiple Input Multiple Output), and thereby achieves a maximum 100 Mbps for downlink and maximum 50 Mbps for uplink. Accordingly, it is hoped for as a system that realizes a full-fledged high-speed wireless packet communication.

A mobile terminal 20-3 according to a third configuration example described below is applicable the wireless communication system 1 according to the first configuration example which uses the LTE mentioned above, for example.

Figure 7:
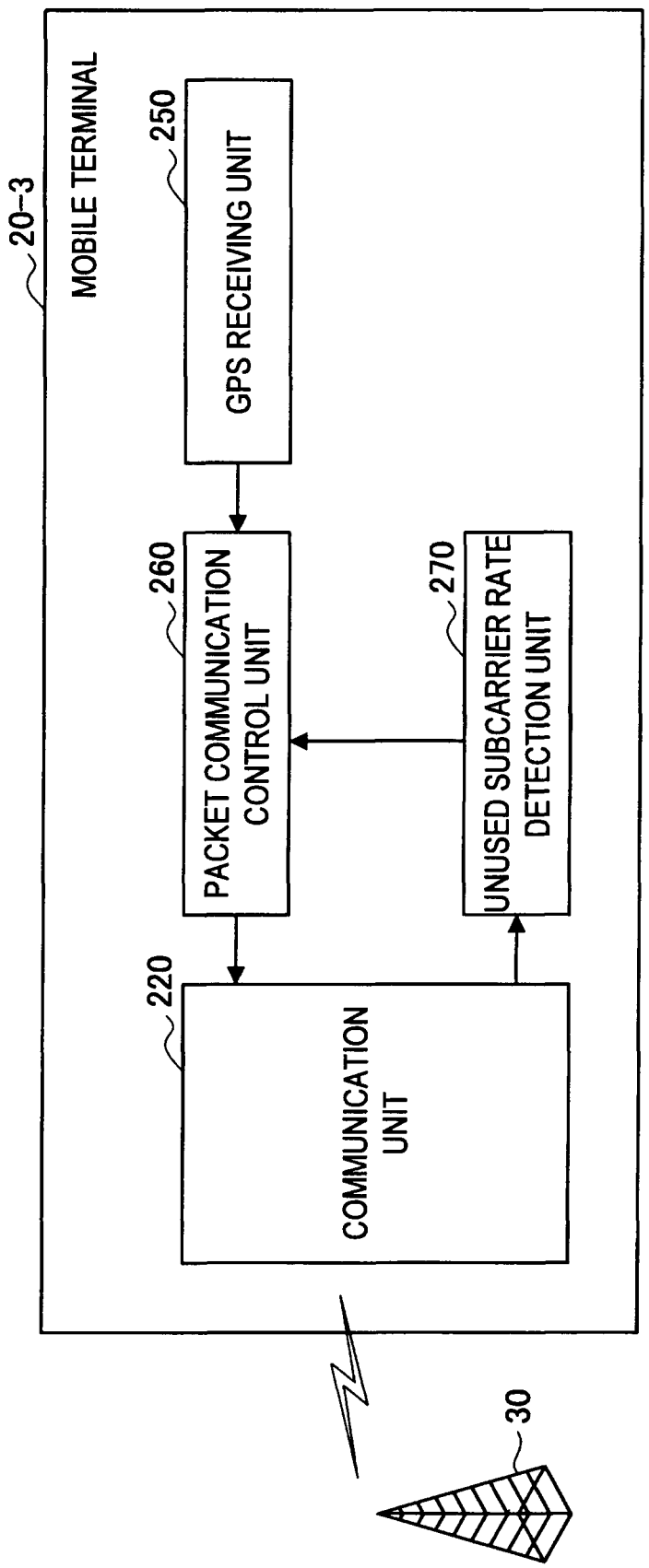
FIG. 7 is a functional block diagram showing a mobile terminal according to a third configuration example.

FIG. 7 is a functional block diagram showing the mobile terminal 20-3 according to the third configuration example. As shown in FIG. 7, the mobile terminal 20-3 according to the third configuration example includes the communication unit 220, the GPS receiving unit 250, the packet communication control unit 260, and an unused subcarrier rate detection unit 270.

The communication unit 220 is an interface to the base station 30, and has a function of a receiving unit for receiving a wireless signal transmitted from the base station 30 and a function of a transmitting unit for transmitting a wireless signal to the base station 30. Additionally, as described above, this configuration example assumes a case where the communication unit 220 receives an OFDMA signal from the base station 30.

As with the first configuration example, the GPS receiving unit 250 functions as an acquisition unit for acquiring location information indicating the current location of the mobile terminal 20-3 by receiving and decoding a GPS signal transmitted from a satellite. Additionally, the location information obtained by the GPS receiving unit 250 corresponds to a subordinate concept of the location identification information enabling the identification of a location.

The unused subcarrier rate detection unit 270 detects the ratio of the number of subcarriers not used as a communication resource (unused subcarrier rate) among the total number of subcarriers in an OFDM symbol to which a physical downlink shared channel (PDSCH) is mapped. The frequency of detection of the unused subcarrier rate by the unused subcarrier rate detection unit 270 is determined by the tradeoff between power consumption and detection accuracy.

Additionally, to alleviate the issue of interference, the base station 30 is assumed to make use of unused resources by nulling the subcarriers. Accordingly, the unused subcarrier rate detection unit 270 is assumed to be able to distinguish an unused resource by detecting power of each subcarrier.

Here, the flow of basic operation by the mobile terminal 20-3 will be described. The mobile terminal 20-3 can identify a physical cell ID during the process of performing cell search for a base station 30 with the smallest propagation loss and acquiring synchronization between a primary synchronization signal (PSS) and a secondary synchronization signal (SSS).

Furthermore, the mobile terminal 20-3 obtains information such as a system bandwidth notified by the base station 30 by decoding a physical broadcast channel (PBCH). Then, after performing location registration and the like to the base station 30, the mobile terminal 20-3 starts communication by itself or goes into an idle state (RRC_IDLE state) until a paging is received. Additionally, when in the idle state, the mobile terminal 20-3 may, during the intermittent reception period, periodically search for a cell in a better condition or check whether there is a paging notified by a PDCCH.

Furthermore, to reselect a cell, the mobile terminal 20-3 measures the reception quality of a serving cell (an already camped cell) and a neighbouring cell. Specifically, the mobile terminal 20-3 measures the reception quality by receiving a reference signal (RS) unique to a cell and obtaining the average reference signal received power. Furthermore, an indicator R-criterion is defined, and R-criteria $R_s$ and $R_n$ for the serving cell and the neighbouring cell are expressed by the following formulae 2 and 3.

[Equation 2]

$$R_s = Q_{meas,s} + Q_{hyst,s} \quad \text{(Formula 2)}$$

[Equation 3]

$$R_n = Q_{meas,n} + Q_{off\_s,n} \quad \text{(Formula 3)}$$

The $Q_{hyst,s}$ is a parameter for controlling the degree of hysteresis to prioritize the R-criteria. The $Q_{off\_s,n}$ is an offset amount to be applied between the serving cell and the neighbouring cell.

Next, the mobile terminal 20-3 decodes the PDCCH, which is a physical channel for transmitting control information, to check whether there is a paging.

The PDCCH is assigned to 3 symbols at the beginning of each subframe configured by 14 symbols, and the mobile terminal 20-3 in the idle state can check whether there is a paging by decoding these 3 symbols in the intermittent period.

To efficiently decode the PDCCH, a Common search space in which a PDCCH to be transmitted to all the mobile terminals is mapped and a UE-Specific search space in which a PDCCH to be transmitted to a specific mobile terminal is mapped are defined in the 3-symbol resource block. Paging information is transmitted being mapped to the Common search space, and thus it is considered sufficient that an idle mobile terminal 20-3 decodes at least the Common search space.

Additionally, a cycle DRX of the intermittent reception is determined by the mobile terminal 20-3 by processing a paging parameter notified by the serving cell. The mobile terminal 20-3 can detect whether there is the above-described paging and also, can reselect a cell, according to the cycle DRX. For example, when the quality of the serving cell falls below a certain threshold value, the mobile terminal 20-3 performs measurement of the neighbouring cell more frequently than the cycle DRX, and reduces the risk of going out of service range.

Furthermore, with regard to the measurement of the RSRP, the specification only defines the use of the RS unique to a cell, and how many RSs among RSs mapped in the frequency domain are to be used and how many RSs are among RSs mapped in the time domain are to be used depend on the application.

Accordingly, the unused subcarrier rate detection unit 270 basically periodically detects the unused subcarrier rate separately from the measurement of the RSRP while taking power consumption into consideration. On the other hand, in case of measuring the RSRP in a region in which a PDSCH is mapped and by using all the RSs mapped in the frequency domain, the unused subcarrier rate detection unit 270 can also perform detection of the unused subcarrier rate together with the RSRP measurement.

The packet communication control unit 260 transmits the location identification information obtained by the GPS receiving unit 250 and the unused subcarrier rate obtained by the unused subcarrier rate detection unit 270 as the indicator of the quality of communication to the estimation server 10 outside the core network to which the base station 30 belongs via the gateway 42 of the core network. As a result, the estimation server 10 can estimate the available capacity of the base station 30, for example, based on the indicator of the quality of communication and the location identification information.

Additionally, if the packet communication control unit 260 is replaced by an IMS-compliant unit that functions to comply with IMS, the mobile terminal 20-3 can be applied to the wireless communication system 3 according to the third configuration example shown in FIG. 3.

3-4. Fourth Configuration Example

Figure 8:
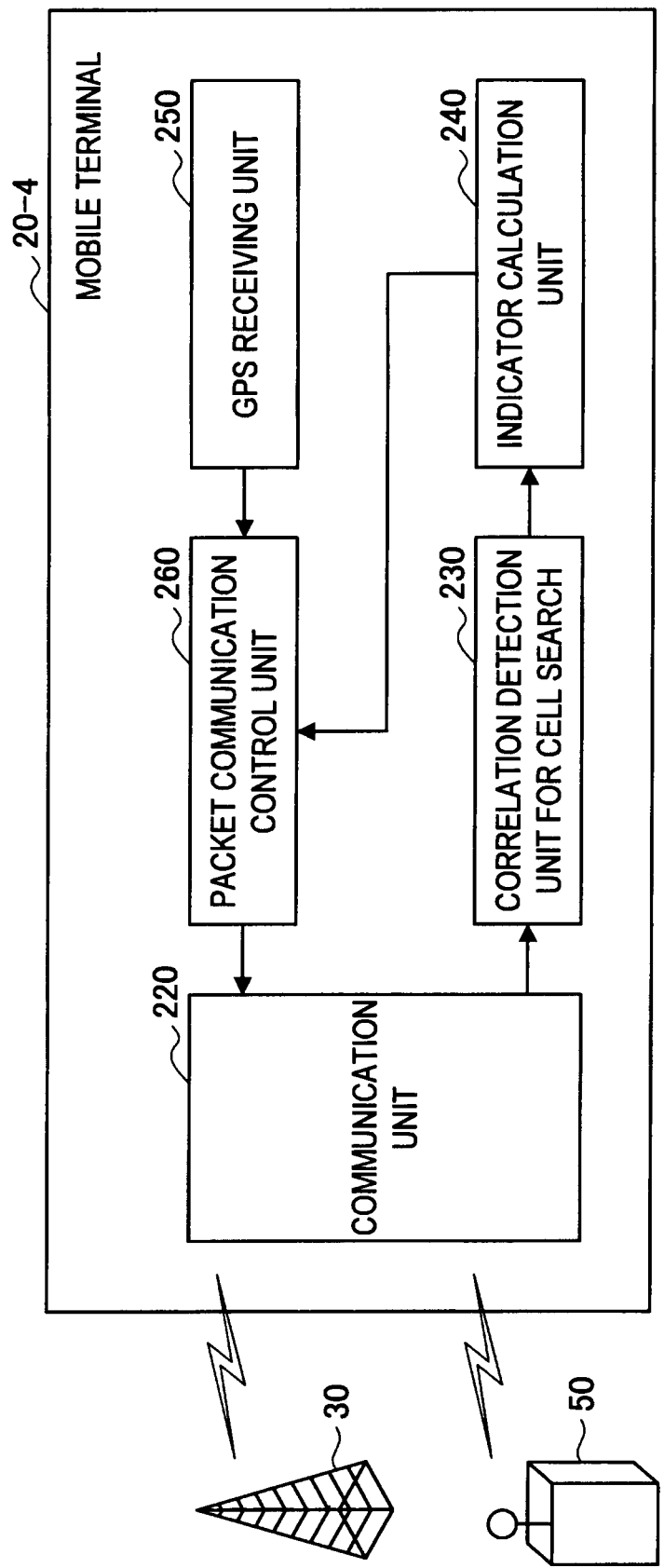
FIG. 8 is a functional block diagram showing a mobile terminal according to a fourth configuration example.

FIG. 8 is a functional block diagram showing a mobile terminal 20-4 according to a fourth configuration example. As shown in FIG. 8, the mobile terminal 20-4 according to the fourth configuration example includes the communication unit 220, the correlation detection unit 230 for cell search, the indicator calculation unit 240, the GPS receiving unit 250, and the packet communication control unit 260. The mobile terminal 20-4 according to the fourth configuration is applicable the wireless communication system 2 according to the second configuration example, for example.

The mobile terminal 20-4 can register location with either of the first base station 30 and the second base station 50. Accordingly, the correlation detection unit 230 for cell search and the indicator calculation unit 240 can acquire the indicator of the quality of communication for estimating the available capacity of the first base station 30 at the time of performing cell search for the first base station 30, and can acquire the indicator of the quality of communication for estimating the available capacity of the second base station 50 at the time of performing cell search for the second base station 50.

As with the first configuration example, the GPS receiving unit 250 functions as an acquisition unit for acquiring location information (location identification information) indicating the current location of the mobile terminal 20-4 by receiving and decoding a GPS signal transmitted from a satellite.

The packet communication control unit 260 transmits the location identification information obtained by the GPS receiving unit 250 and the indicator of the quality of communication for estimating the available capacity of the first base station 30 obtained by the indicator calculation unit 240 to the estimation server 10 via the gateway 42 of the core network to which the base station 30 belongs. Similarly, the packet communication control unit 260 transmits the location identification information obtained by the GPS receiving unit 250 and the indicator of the quality of communication for estimating the available capacity of the second base station 50 obtained by the indicator calculation unit 240 to the estimation server 10 via the gateway 62 of the core network to which the base station 50 belongs. As a result, the estimation server 10 can estimate the available capacity of both the base station 30 and the base station 50 based on the indicator of the quality of communication and the location identification information.

3-5. Fifth Configuration Example

Figure 9:
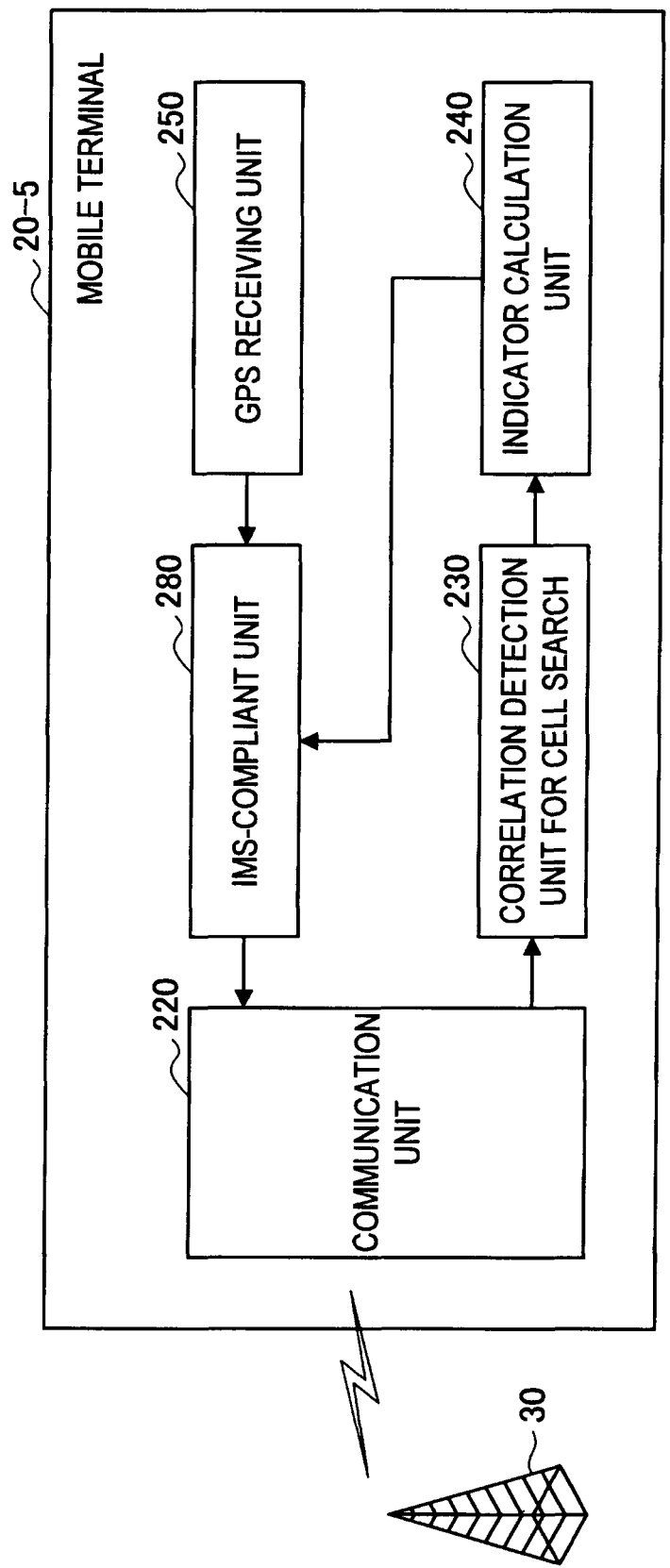
FIG. 9 is a functional block diagram showing a mobile terminal according to a fifth configuration example.

FIG. 9 is a functional block diagram showing a mobile terminal 20-5 according to a fifth configuration example. As shown in FIG. 9, the mobile terminal 20-5 according to the fifth configuration example includes the communication unit 220, the correlation detection unit 230 for cell search, the indicator calculation unit 240, the GPS receiving unit 250, and an IMS-compliant unit 280. The mobile terminal 20-5 according to the fifth configuration is applicable the wireless communication system 3 according to the third configuration example, for example.

The correlation detection unit 230 for cell search performs the three-step cell search as with the first configuration example, and the indicator calculation unit 240 calculates the indicator of the quality of communication based on the correlation output for each scrambling code obtained in the process of the three-step cell search.

As with the first configuration example, the GPS receiving unit 250 functions as an acquisition unit for acquiring location information (location identification information) indicating the current location of the mobile terminal 20-5 by receiving and decoding a GPS signal transmitted from a satellite.

The IMS-compliant unit 280 controls communication by SIP message, for example. According to the IMS, a control communication network and a media communication network are completely separated, and, after IMS authentication, a radio resource is allocated at all times to the control communication network for exchanging SIP messages. That is, according to the IMS, a SIP message reaches the S-CSCF 75 from the mobile terminal 20-5 with high reliability. Also, a plurality of various types of message bodies, such as a message in a text format, can be included in the SIP message.

Accordingly, the IMS-compliant unit 280 may add to the message body of the SIP message the location identification information obtained by the GPS receiving unit 250 and the indicator of the quality of communication obtained by the indicator calculation unit 240. Then, the IMS-compliant unit 280 can transmit the SIP message to the S-CSCF 75, the HSS 76 or the AS 78 on the home network side via the base station 30 and the P-CSCF 72. Additionally, the IMS-compliant unit 280 may also encrypt the location identification information and the indicator of the quality of communication and add the same to the message body of the SIP message.

4. OPERATION OF MOBILE TERMINAL

Heretofore, configuration examples of the mobile terminal 20 have been described with reference to FIGS. 5 to 9. Subsequently, the flow of a wireless communication method to be performed by the mobile terminal 20 will be described with reference to FIG. 10.

Figure 10:
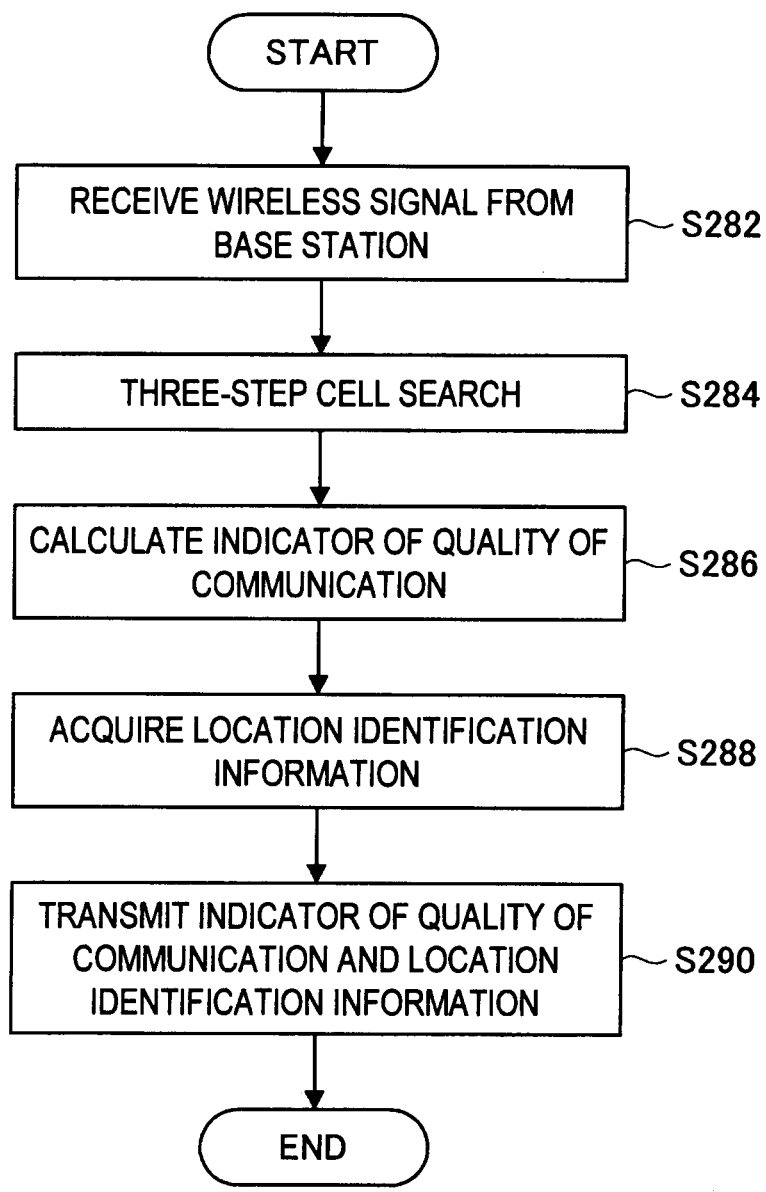
FIG. 10 is a flow chart showing a flow of a wireless communication method performed by a mobile terminal.

FIG. 10 is a flow chart showing a flow of a wireless communication method performed by the mobile terminal 20. As shown in FIG. 10, the communication unit 220 receives a wireless signal from the base station 30 (S282), and the correlation detection unit 230 for cell search performs the three-step cell search based on the wireless signal received by the communication unit 220 (S284).

Then, the indicator calculation unit 240 calculates the indicator of the quality of communication for estimating the available capacity of the base station 30, based on the size of the correlation outputs of a plurality of scrambling codes obtained in the process of the three-step cell search (S286). For its part, the GPS receiving unit 250 acquires the location information (location identification information) indicating the current location of the mobile terminal 20 by receiving and decoding a GPS signal transmitted from a satellite (S288).

The packet communication control unit 280 transmits the indicator of the quality of communication obtained by the indicator calculation unit 240 and the location identification information obtained by the GPS receiving unit 250 in this manner to the estimation server 10 via the communication unit 220 (S290).

5. CONFIGURATION OF ESTIMATION SERVER

Next, the configuration of the estimation server 10 will be described with reference to FIGS. 11 and 12.

Figure 11:
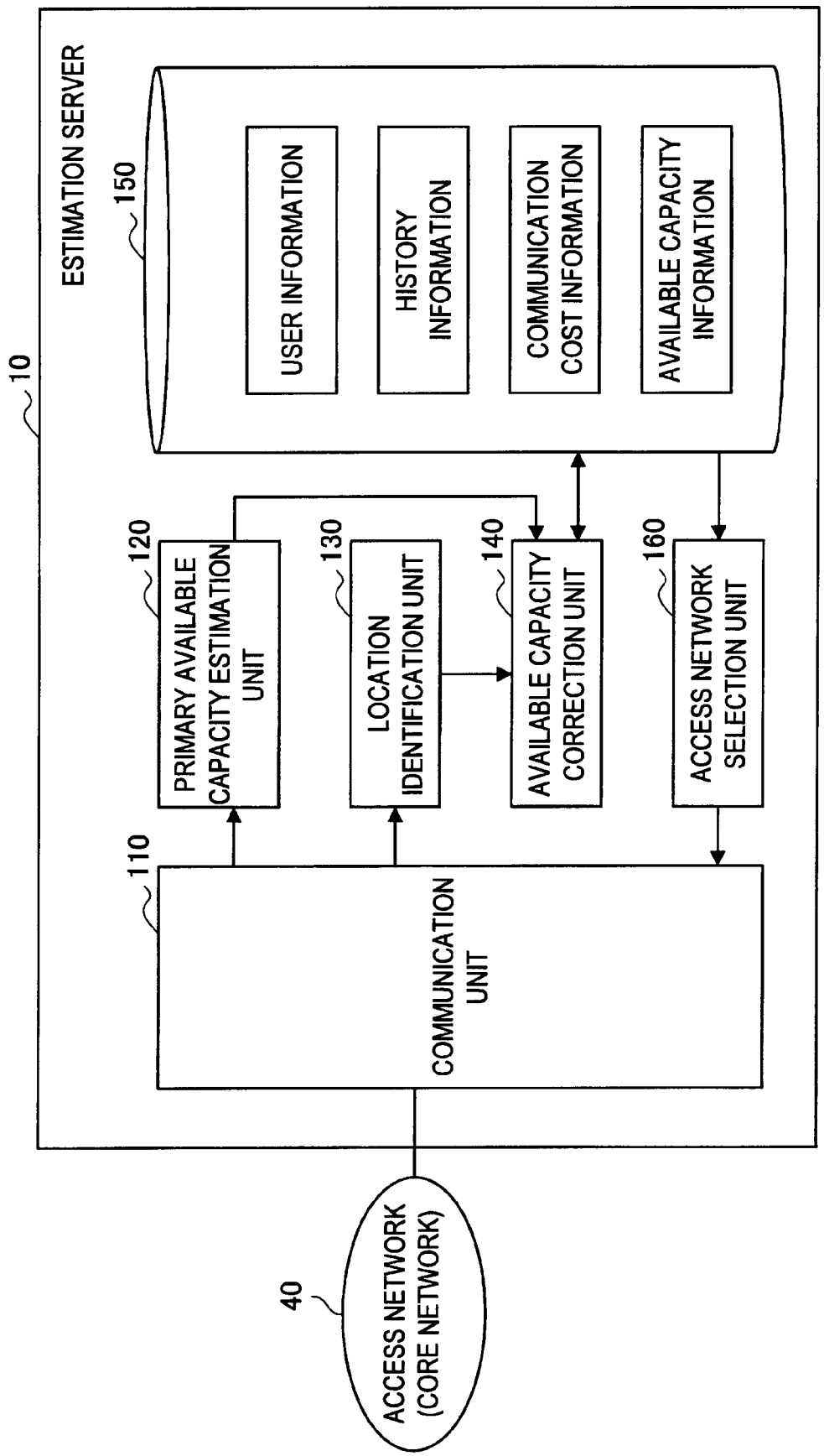
FIG. 11 is an explanatory diagram showing a configuration of an estimation server.

FIG. 11 is an explanatory diagram showing the configuration of the estimation server 10. As shown in FIG. 11, the estimation server 10 includes a communication unit 110, a primary available capacity estimation unit 120, a location identification unit 130, an available capacity correction unit 140, a storage unit 150, and an access network selection unit 160. This estimation server 10 is applicable the first to third configuration examples of the wireless communication system shown in FIGS. 1 to 3.

The communication unit 110 is an interface to the mobile terminal 20, and functions as a receiving unit for receiving the indicator of the quality of communication, the location identification information and the like transmitted from the mobile terminal 20, for example, via the access network 40.

The primary available capacity estimation unit 120 (estimation unit) primarily estimates, from the indicator of the quality of communication received by the communication unit 110, the available capacity of a cell (base station 30) with which the location of the mobile terminal 20 is registered. For example, when the indicator of the quality of communication is the b/a described above, the indicator of the quality of communication grows larger as the number of multiplexed DPCHs, which are channels allocated to other mobile terminals, increases. Accordingly, the primary available capacity estimation unit 120 can primarily estimate the available capacity of the base station 30 based on the indicator of the quality of communication b/a. More specifically, the primary available capacity estimation unit 120 may estimate the available capacity of the base station 30 to be at a level that is higher as the indicator of the quality of communication b/a is smaller (the available capacity is higher), among a plurality of digital levels.

Additionally, the indicator of the quality of communication b/a is expected to be a constant value which is not dependent on the distance between the base station 30 and the mobile terminal 20-1. For example, in case an AGC is not operating in a receiving circuit, each of the correlation outputs a and b will have a smaller value as the distance between the base station 30 and the mobile terminal 20-1 becomes greater. However, the values will become smaller at the same rate, and thus, the indicator of the quality of communication b/a is assumed to be constant, without being dependent on the distance between the base station 30 and the mobile terminal 20-1. On the other hand, in case the AGC is operating in the receiving circuit, if the base station 30 is transmitting the same signal, the correlation outputs a and b ideally become constant, and thus, the indicator of the quality of communication b/a will also be a constant value.

Furthermore, the influence of noise floor of the receiving circuit of the mobile terminal 20-1 on the available capacity of the base station 30 that is to be estimated based on the indicator of the quality of communication b/a is different depending on the distance between the mobile terminal 20-1 and the base station 30. Specifically, as the mobile terminal 20-1 gets farther away from the base station 30, the available capacity of the base station 30 will be estimated to be less than the actual available capacity due to the noise floor of the receiving circuit. This is because, since the noise floor of the receiving circuit is a random signal, the noise floor acts to increase the value of b as the mobile terminal 20-1 gets farther away from the base station 30. However, the communication environment of the mobile terminal 20-1 existing at the cell edge far from the base station 30 is significantly poor, and thus, it is assumed that, even if the available capacity of the base station 30 is estimated to be less than the actual available capacity, the bad influence is restrictive.

The location identification unit 130 identifies the current location of the mobile terminal 20 based on the location identification information received by the communication unit 110. For example, when the location identification information is the reception intensity from each of the plurality of base stations 30 described in "3-2. Second Configuration Example," the location identification unit 130 identifies the current location of the mobile terminal 20 by the method described below.

Figure 12:
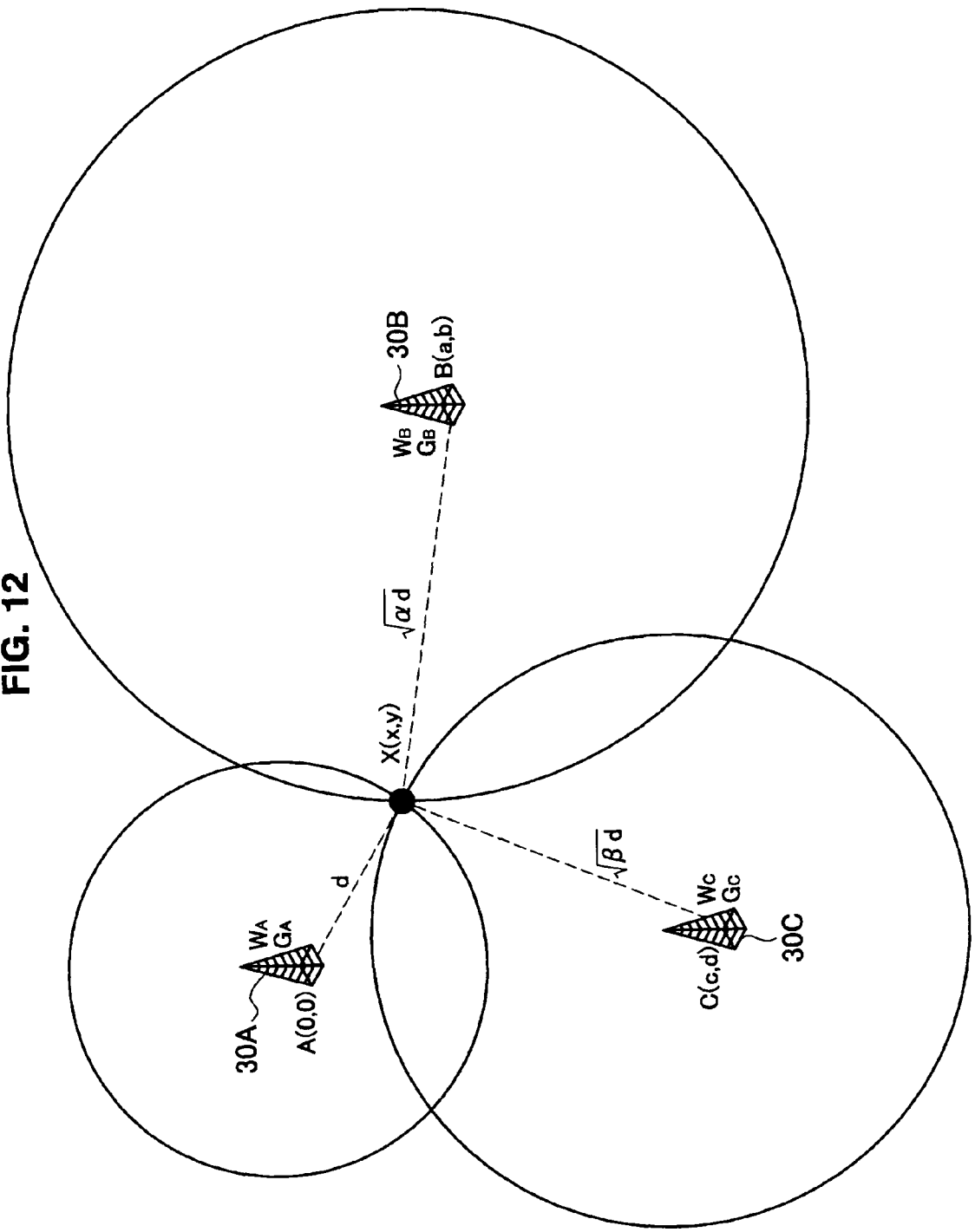
FIG. 12 is a diagram for illustrating a method of identifying a current location based on a reception intensity from each of a plurality of base stations.

FIG. 12 is a diagram for illustrating the method of identifying the current location based on the reception intensity from each of the plurality of base stations 30. Additionally, for the sake of explanation, the concept of a sector is not included. As shown in FIG. 12, the transmission power and the absolute gain of the transmission antenna of the base station 30A are respectively referred to as $W_A$ and $G_A$, the transmission power and the absolute gain of the transmission antenna of the base station 30B are respectively referred to as $W_B$ and $G_B$, and the transmission power and the absolute gain of the transmission antenna of the base station 30C are respectively referred to as $W_C$ and $G_C$.

Also, the coordinates of the base stations 30A to 30C are known, and the coordinate of the base station 30A is A(0, 0), the coordinate of the base station 30B is B(a, b), the coordinate of the base station 30C is C(c, d), and the coordinate at which the mobile terminal 20 is located is X(x, y). Also, it is assumed that the ratio of distances from point A, point B and point C to point X is known. Furthermore, when taking the distance from point A to point X as variable z, the ratio of the square of the distance between point B and point X to $z^2$ as $\alpha$, and the ratio of the square of the distance between point C and point X to $z^2$ as $\beta$, the following formulae 4 to 6 are obtained.

[Equation 4]

$$x^2+y^2=z^2 \quad \text{(Formula 4)}$$

[Equation 5]

$$(x-a)^2+(y-b)^2=\alpha z^2 \quad \text{(Formula 5)}$$

[Equation 6]

$$(x-c)^2+(y-d)^2=\beta z^2 \quad \text{(Formula 6)}$$

Here, a, b, c, d, $\alpha$ (>1), and $\beta$ (>1) are known values, and x, y, and z are variables. The following formula 7 is obtained from the formulae 4 and 5, and the following formula 8 is obtained from the formulae 5 and 6.

[Equation 7]

$$\left(x-\frac{a}{1-\alpha}\right)^2+\left(y-\frac{b}{1-\alpha}\right)^2=\left(\frac{1}{(1-\alpha)^2}-\frac{1}{1-\alpha}\right)\cdot(a^2+b^2) \quad \text{(Formula 7)}$$

[Equation 8]

$$\left(x-\frac{c}{1-\beta}\right)^2+\left(y-\frac{d}{1-\beta}\right)^2=\left(\frac{1}{(1-\beta)^2}-\frac{1}{1-\beta}\right)\cdot(c^2+d^2) \quad \text{(Formula 8)}$$

The formula 7 indicates the locus of a circle whose centre is (a/(1−$\alpha$), b/(1−$\alpha$)) and whose radius is a square root of the right-hand side. Similarly, the formula 8 indicates the locus of a circle whose centre is (c/(1−$\beta$), d/(1−$\beta$)) and whose radius is a square root of the right-hand side. Accordingly, (x, y) satisfying the formulae 4 to 6 corresponds to the intersection of the loci of the two circles indicated by the formulae 7 and 8.

On the other hand, received power densities $P_A$, $P_B$, and $P_C$ from the base stations 30A, 30B and 30C at X(x, y) are expressed by the following formulae 9 to 11.

[Equation 9]

$$P_A=\frac{W_A G_A}{4\pi d^2} \quad \text{(Formula 9)}$$

[Equation 10]

$$P_B=\frac{W_B G_B}{4\pi \alpha d^2} \quad \text{(Formula 10)}$$

[Equation 11]

$$P_C=\frac{W_C G_C}{4\pi \beta d^2} \quad \text{(Formula 11)}$$

When $W_A=W_B=W_C$ and $G_A=G_B=G_C$, the following formulae 12 and 13 are obtained from the formulae 9 to 11.

[Equation 12]

$$\alpha = \frac{P_A}{P_B} \quad \text{(Formula 12)}$$

[Equation 13]

$$\beta = \frac{P_A}{P_C} \quad \text{(Formula 13)}$$

The α and β will be known values by the above formulae 12 and 13. Additionally, even if the transmission outputs $W_A$, $W_B$ and $W_C$ of the base stations 30A to 30C are different, the ratio of distances from respective base stations 30 to X(x, y) can be obtained, provided that information relating to the transmission outputs of the base stations 30A to 30C is notified by the BCH. The same can be said for a case where the transmission output of the CPICH is notified by the BCH.

The location identification unit 130 can identify the current location of the mobile terminal 20 from the reception intensity, as the location identification information, from each of the plurality of base stations 30 by the above calculations. Additionally, when the location identification information is location information indicating latitude and longitude, the location identification unit 130 does not have to perform any special calculation.

We will return to the description of the configuration of the estimation server 10 with reference to FIG. 11. As has been described, the primary available capacity estimation unit 120 estimates the available capacity of the base station 30 based on, for example, the indicator of the quality of communication b/a. However, as the mobile terminal 20 gets farther away from the base station 30, the base station 30 will set the amplitude of the DPCH allocated to the mobile terminal 20 to be larger, and thus the value of b will become larger. That is, the indicator of the quality of communication b/a will have a different meaning with regard to the available capacity of the base station 30 depending on the location of the mobile terminal 20.

In the following, the influence of the distance between the mobile terminal 20 and the base station 30 on the available capacity of the base station 30 that is estimated based on the indicator of the quality of communication b/a will be described in greater detail. Let us assume that the estimation server 10 has estimated the available capacity of the base station 30 based on an indicator of the quality of communication b1/a1 received from the mobile terminal 20 that is attempting to start communication. Here, in case the mobile terminal 20 exists near the base station 30, the base station 30 can multiple-transmit a DPCH for the mobile terminal 20 with low power. Accordingly, the influence on the available capacity (degree of congestion) of the base station 30 due to the start of signal transmission to this mobile terminal 20 existing near the base station 30 is small. That is, the amount of reduction in the available capacity of the base station 30 caused by the start of signal transmission to the mobile terminal 20 existing near the base station 30 is small.

On the other hand, in case the mobile terminal 20 exists far from the base station 30, the base station 30 will multiple-transmit a DPCH for this mobile terminal 20 with high power. Accordingly, the influence on the available capacity (degree of congestion) of the base station 30 due to the start of signal transmission to this mobile terminal 20 existing far from the base station 30 is large. That is, the amount of reduction in the available capacity of the base station 30 caused by the start of signal transmission to the mobile terminal 20 existing far from the base station 30 is large.

Thus, the available capacity correction unit 140 (correction unit) corrects the available capacity of the base station 30 estimated by the primary available capacity estimation unit 120 by using the distance between the mobile terminal 20 and the base station 30. Specifically, the available capacity correction unit 140 may correct the available capacity of the base station 30 estimated by the primary available capacity estimation unit 120 to a value smaller as the distance between the mobile terminal 20 and the base station 30 is increased. Additionally, the distance between the mobile terminal 20 and the base station 30 can be obtained from the difference between the location of the mobile terminal 20 identified by the location identification unit 130 and the known installation location of the base station 30.

The storage unit 150 is a storage medium storing user information, history information, communication cost information, available capacity information, and the like. Additionally, the storage unit 150 (user information storage unit, communication cost storage unit) may be a storage medium such as a non-volatile memory, a magnetic disk, an optical disk, a magneto optical (MO) disk, and the like. The non-volatile memory may be an electrically erasable programmable read-only memory (EEPROM), and an erasable programmable ROM (EPROM), for example. Also, the magnetic disk may be a hard disk, a discoid magnetic disk, and the like. Also, the optical disk may be a compact disc (CD), a digital versatile disc recordable (DVD-R), a Blu-ray disc (BD; registered trademark), and the like.

When a plurality of access networks can be used by the mobile terminal 20 as shown in FIG. 2, the access network selection unit 160 (selection unit) selects an access network suitable for the mobile terminal 20 based on the available capacity corrected by the available capacity correction unit 140 and various types of information stored in the storage unit 150. Concrete example of this selection will be described in "6-3. Third Operation Example" and "6-4. Fourth Operation Example."

6. OPERATION OF ESTIMATION SERVER

Heretofore, the configuration of the estimation server 10 has been described with reference to FIGS. 11 and 12. Subsequently, the first to fourth configuration examples of the estimation server 10 will be described with reference to FIGS. 13 to 16.

6-1. First Operation Example

Figure 13:
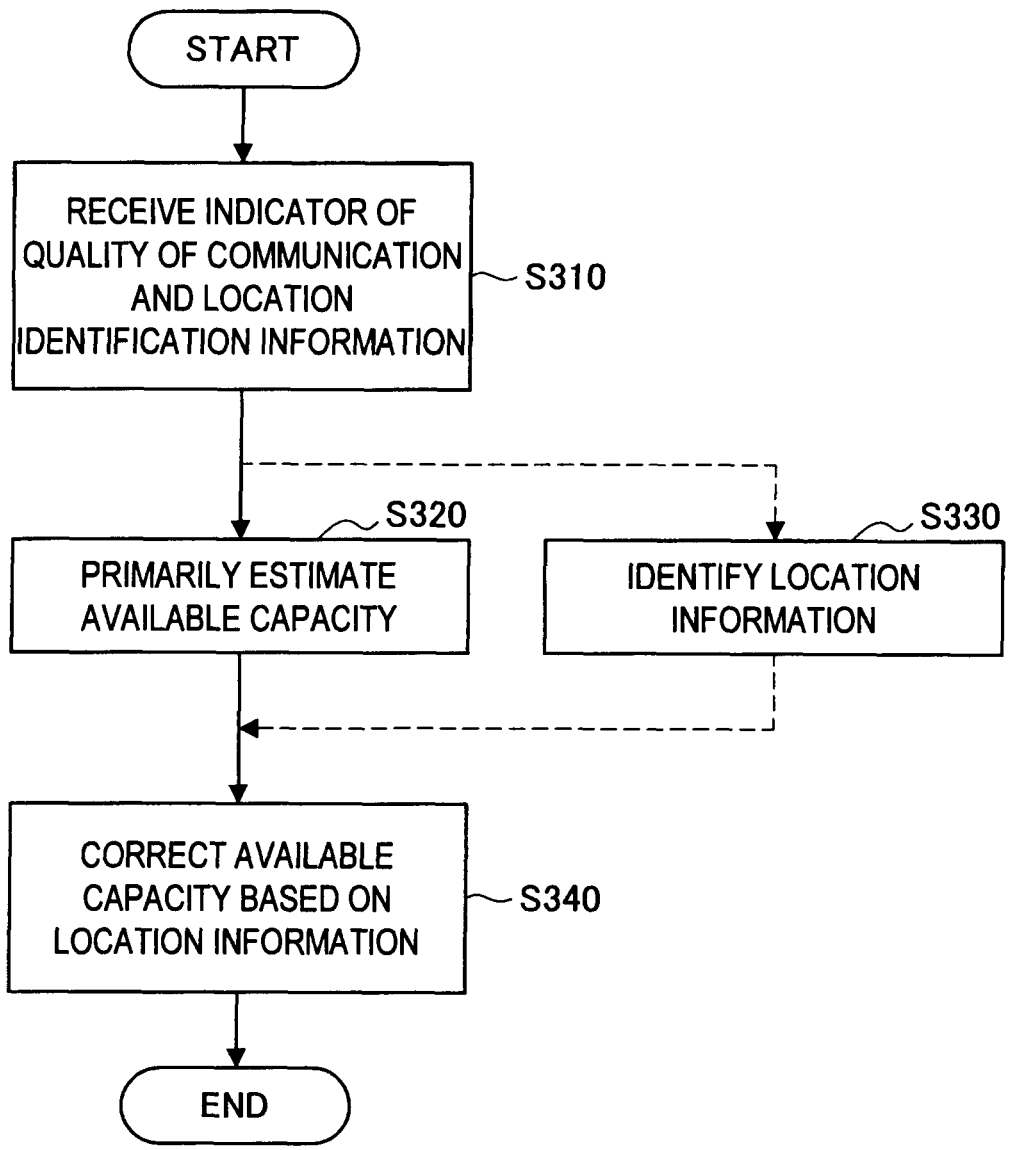
FIG. 13 is a flow chart showing a first operation example of the estimation server.

FIG. 13 is a flow chart showing the first operation example of the estimation server 10. As shown in FIG. 13, first, when the communication unit 110 of the estimation server 10 receives the indicator of the quality of communication and the location identification information from the mobile terminal 20 (S310), the primary available capacity estimation unit 120 primarily estimates the available capacity of the base station 30 based on the indicator of the quality of communication (S320). Also, when the location identification information is not information directly indicating the latitude and longitude, the location identification unit 130 identifies the current location of the mobile terminal 20 based on the location identification information (S330). Then, the available capacity correction unit 140 corrects the available capacity estimated by the primary available estimation unit 120 by using the distance between the mobile terminal 20 and the base station 30 (S340).

6-2. Second Operation Example

Figure 14:
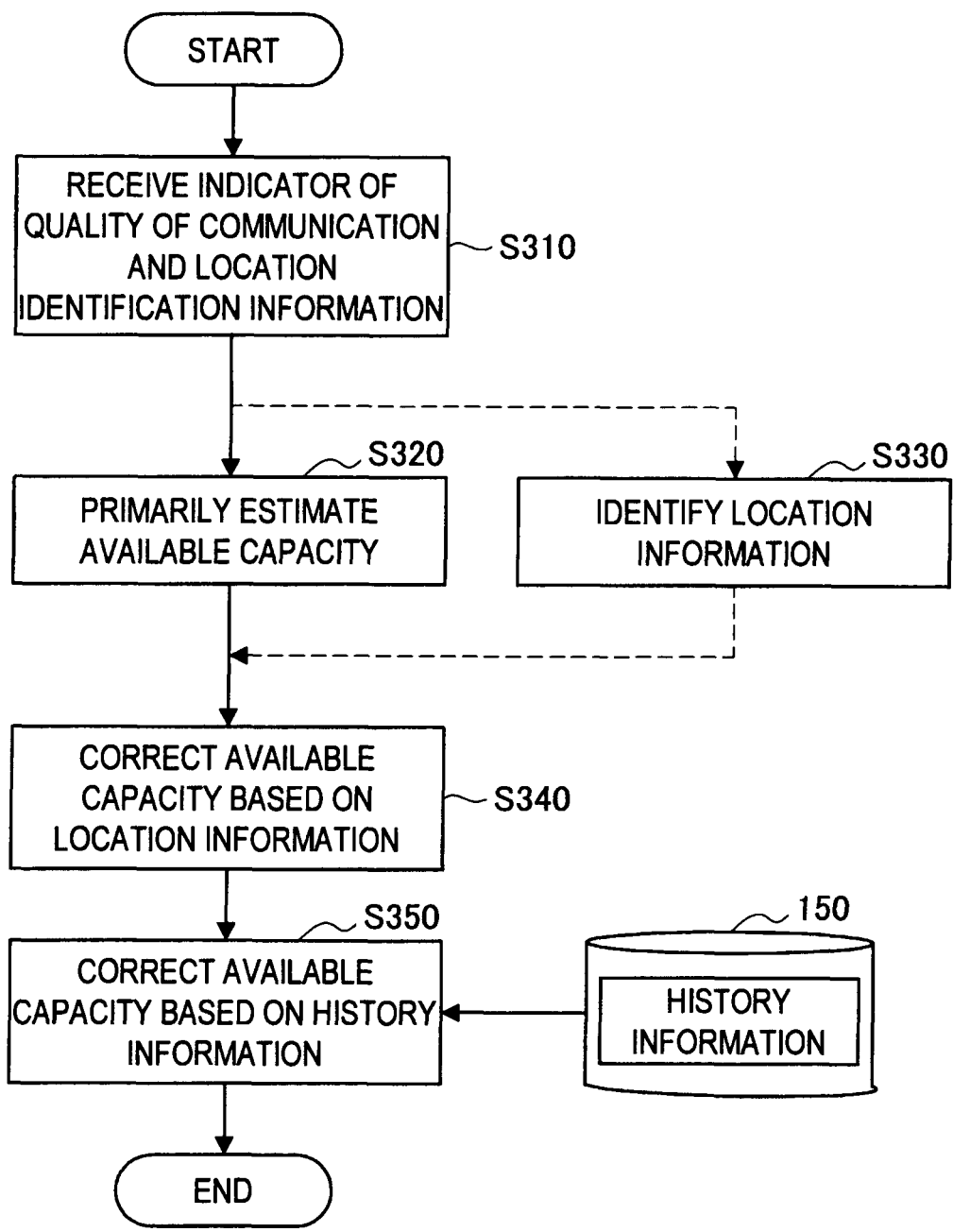
FIG. 14 is a flow chart showing a second operation example of the estimation server.

FIG. 14 is a flow chart showing the second operation example of the estimation server 10. As shown in FIG. 14, the second operation example includes, after the processes of S310 to S340 shown in the first operation example, a process of further correcting the available capacity based on history information (S350). The history information is stored in the storage unit 150, and is information relating to the history of influences of the location information of many mobile terminals on the available capacity, information relating to the history of the QoSs that are actually obtained, and the like. The available capacity correction unit 140 further corrects, by using the history information, the available capacity that has been corrected in S340 by using the location information. Let us assume, for example, that the history information includes the relationship between a previously estimated available capacity and the QoS, and that the QoS is less than the QoS expected from the estimated available capacity. In this case, the actual available capacity is considered to be less than the estimated available capacity, and thus, the available capacity correction unit 140 may correct the available capacity to be less.

6-3. Third Operation Example

Figure 15:
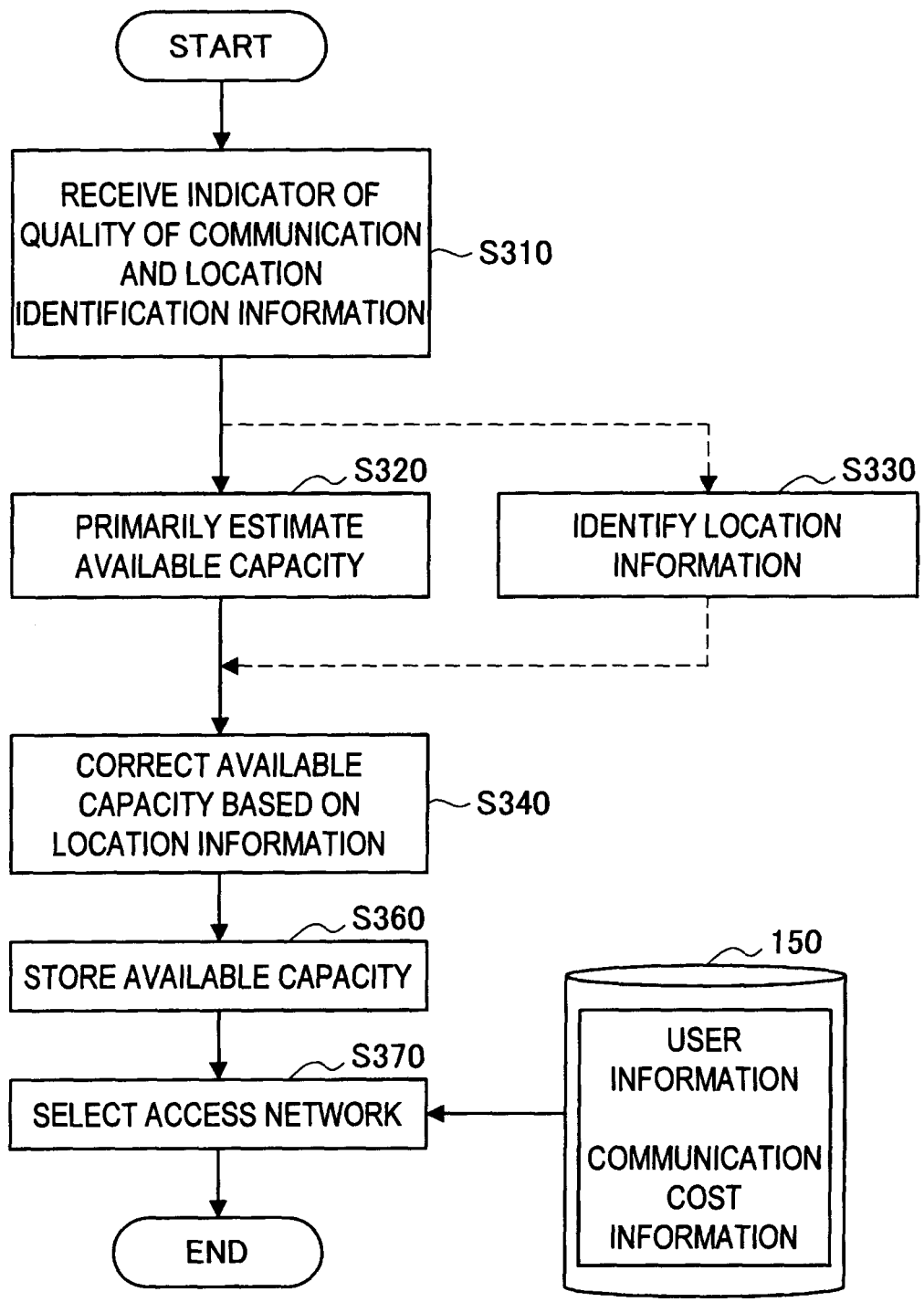
FIG. 15 is a flow chart showing a third operation example of the estimation server.

FIG. 15 is a flow chart showing the third operation example of the estimation server 10. As shown in FIG. 15, the third operation example includes, after the processes of S310 to S340 shown in the first operation example, storing of the available capacity (S360) and selection of an access network (S370).

Specifically, the available capacity corrected by the available capacity correction unit 140 in S340 is stored in the storage unit 150 (S360). The storage unit 150 also stores user information indicating the preference of a user of the mobile terminal 20 on communication. Weighting on cost indicating that a user desires low cost, weighting on high communication speed indicating that a user desires high-speed communication, and the like, are set as the user information. This user information may be set based on a user operation on the mobile terminal 20. Furthermore, the storage unit 150 stores communication cost information indicating the communication cost for each access network. For example, information indicating the communication cost per unit time, information indicating the communication cost per unit data amount, and the like, are assumed as the communication cost information, for example.

Then, the access network selection unit 160 selects an access network suitable for the user of the mobile terminal 20 based on the available capacity stored in the storage unit 150, the user information and the communication cost information (S370). For example, when preference for cost is set in the user information of the mobile terminal 20, the access network selection unit 160 refers to the communication cost information, selects an access network with the lowest communication cost, and notifies the mobile terminal 20. On the other hand, when preference for high communication speed is set in the user information of the mobile terminal 20, the access network selection unit 160 refers to the available capacity for each access network stored in the storage unit 150, selects an access network with the highest available capacity, and notifies the mobile terminal 20. Additionally, preference of a user may be set in the user information according to conditions. For example, preference for high communication speed is set in case of downloading a packet having a certain size or more, and preference for cost is set in other cases.

6-4. Fourth Operation Example

Figure 16:
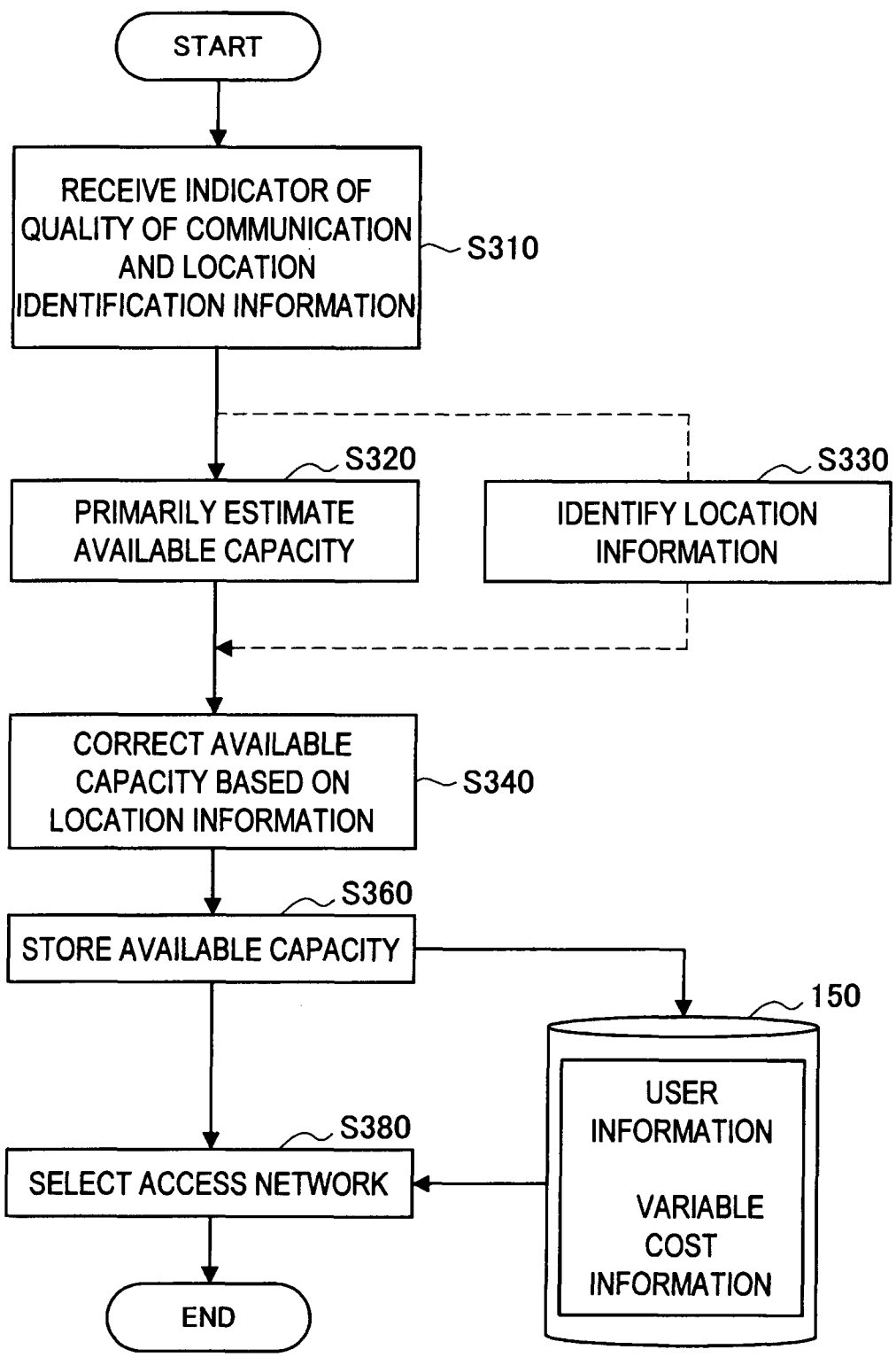
FIG. 16 is a flow chart showing a fourth operation example of the estimation server.

FIG. 16 is a flow chart showing the fourth operation example of the estimation server 10. As shown in FIG. 16, the fourth operation example includes, after the processes of S310 to S340 shown in the first operation example, storing of the available capacity (S360) and selection of an access network (S380).

Specifically, the available capacity corrected by the available capacity correction unit 140 in S340 is stored in the storage unit 150 (S360). Furthermore, in this operation example, the communication cost is assumed to change depending on the available capacity, and the storage unit 150 stores variable cost information indicating the communication cost per available capacity.

Then, the access network selection unit 160 selects an access network suitable for the user of the mobile terminal 20 based on the available capacity stored in the storage unit 150, the user information and the variable cost information (S380). Specifically, the access network selection unit 160 acquires communication costs in accordance with the available capacities of respective access networks, and in case preference for cost is set in the user information of the mobile terminal 20, selects an access network with the lowest communication cost, and notifies the mobile terminal 20. On the other hand, when preference for high communication speed is set in the user information of the mobile terminal 20, the access network selection unit 160 refers to the available capacity of each access network stored in the storage unit 150, selects an access network with the highest available capacity, and notifies the mobile terminal 20.

7. CONCLUSION

As has been explained, according to the embodiments of the present invention, the following effects can be obtained.

The estimation server 10 can estimate the available capacity of the base station 30 with which the location of the mobile terminal 20 is registered based on an approximate value of an relative amplitude ratio (b/a) of DPCHs allocated to other mobile terminals.

Furthermore, the estimation server 10 notifies the mobile terminal 20 of the estimated available capacity of the base station 30, thereby enabling the mobile terminal 20 to grasp the available capacity of the base station 30 with which the location of the mobile terminal 20 is registered.

Furthermore, the estimation server 10 can identify the location of the mobile terminal 20 even when a GPS function is not provided to the mobile terminal 20 as shown in the second configuration example or even when the mobile terminal 20 is at a location where it is hard to use the GPS function.

Furthermore, the estimation server 10 can select an access network best suited to a user at the time, according to the preference of the user of the mobile terminal 20. Furthermore, even in a case of the communication cost changing depending on the relationship between supply and demand, the estimation server 10 can select an appropriate access network according to the changing communication cost.

Furthermore, by configuring the system according to IMS, as with the wireless communication system 3 according to the third configuration example, the mobile terminal 20 is enabled to communicate with the estimation server 10 (S-CSCF 75, AS 78, and the like) by using a SIP message.

It should be understood by those skilled in the art that various modifications, combinations, sub-combinations and alterations may occur depending on design requirements and other factors insofar as they are within the scope of the appended claims or the equivalents thereof.

For example, an example has been described above where the mobile terminal 20 calculates the indicator of the quality of communication based on the correlation output of a scrambling code and notifies the estimation server 10 of this indicator of the quality of communication. However, the present invention is not limited to such an example. As a modified example, the mobile terminal 20 may notify the estimation server 10 of correlation outputs of a plurality of scrambling codes forming a specific scrambling code group, and the estimation server 10 may calculate the indicator of the quality of communication based on the notified correlation outputs and estimate the available capacity of the base station 30 from the indicator of the quality of communication.

Furthermore, it is not necessary to perform each step in the processing of the estimation server 10 and the mobile terminal 20 in chronological order according to the sequence shown in the sequence chart or the flow chart. For example, each step in the processing of the estimation server 10 and the mobile terminal 20 may include the processing which is performed in parallel or individually (e.g. parallel processing or object processing).

Furthermore, it is also possible to create a computer program for causing hardware such as the CPU 201, the ROM 202, and the RAM 203 that are built in the estimation server 10 and the mobile terminal 20 to perform functions that are the same as each structural element of the estimation server 10 and the mobile terminal 20 described above. A storage medium storing the computer program is also provided.

The present application contains subject matter related to that disclosed in Japanese Priority Patent Application JP 2009-126951 filed in the Japan Patent Office on May 26, 2009, the entire content of which is hereby incorporated by reference.

What is claimed is:

1. A method for estimating an available capacity of a base station within a wireless communication access network, the method comprising:
   computing, using an apparatus disposed outside of a core network of the base station, an indication of a quality of communication between the base station and a mobile terminal, the indication being based on (i) a signal transmitted by the base station and received by the mobile terminal, and (ii) correlation outputs corresponding to a plurality of scrambling codes; and
   estimating, using the apparatus, the available capacity of the base station based on the computed indication, wherein the computing comprises computing the indication using a neighboring cell search, the neighboring cell search comprising:
      detecting one of the correlation outputs between the received signal and a scrambling code assigned to the base station;
      detecting a plurality of the correlation outputs between the received signal and corresponding ones of scrambling codes assigned to neighboring cells;
      identifying a maximum of the detected correlation outputs, the maximum correlation output being associated with a corresponding one of the scrambling codes;
      determining a minimum of the correlation outputs; and
      computing the indication as a ratio of the minimum correlation output to the maximum correlation output.

2. The method of claim 1, wherein the computing comprises computing the indication using a three-step cell search, the three-step cell search comprising:
   detecting a correlation between the received signal received and a primary synchronization code;
   detecting a timing of a received primary synchronization channel;
   detecting, based on the timing, a pattern within combination patterns of a secondary synchronization code having a maximum correlation with the received signal;
   detecting the correlation outputs between the received signal and the plurality of scrambling codes, the plurality of scrambling codes corresponding to a scrambling code group; and
   identifying a maximum of the correlation outputs, the maximum correlation output being associated with a corresponding one of the scrambling codes.

3. The method of claim 1, wherein the computing comprises:
   calculating an average value corresponding to a subset of the correlation outputs, the subset excluding the maximum correlation output; and
   computing the indication as a ratio of the average value to the maximum correlation output.

4. The method of claim 1, wherein a decrease in the ratio indicates an increase in the estimated available capacity of the base station.

5. The method of claim 1, further comprising:
   receiving location information comprising the current location of the mobile terminal, the location information being generated by the mobile terminal; and
   adjusting the estimated available capacity of the base station based on the location information.

6. The method of claim 1, further comprising selecting, for the mobile terminal, a wireless communication access network based on the estimated available capacity and user selected preferences.

7. The method of claim 1, wherein the indication of the quality of communication is based on at least one of a level of interference, an unused subcarrier rate, and a power level of a received signal.

8. A system for estimating an available capacity of a base station within a wireless communication access network, the system comprising:
   a mobile terminal for calculating, using a cell search, an indication of a quality of communication between the mobile terminal and the base station, the indication being based on a signal received by the mobile terminal and correlation outputs of a plurality of scrambling codes; and
   an apparatus disposed outside of the core network of the base station, the apparatus comprising:
      a communication unit for receiving the indication generated by the mobile terminal; and
      a capacity estimation unit for estimating the available capacity of the base station based on the received indication,
   wherein the mobile terminal computes the indication using a neighboring cell search, the neighboring cell search comprising:
      detecting one of the correlation outputs between the received signal and a scrambling code assigned to the base station;
      detecting a plurality of the correlation outputs between the received signal and corresponding ones of scrambling codes assigned to neighboring cells;

identifying a maximum of the detected correlation outputs, the maximum correlation output being associated with a corresponding one of the scrambling codes;
determining a minimum of the correlation outputs; and
computing the indication as a ratio of the minimum correlation output to the maximum correlation output.

9. The system of claim 8, wherein the apparatus further comprises:
a location identification unit for identifying the location of the mobile terminal using location identification information received by the apparatus; and
an available capacity correction unit for adjusting the estimated available capacity of the base station based on the identified location of the mobile terminal.

10. The system of claim 9, wherein the location identification information comprises an indication of the reception intensity from a plurality of base stations located within the wireless communication access network.

11. The system of claim 9, wherein the location identification information comprises information generated by a GPS unit.

12. The system of claim 8, wherein the apparatus further comprises:
a storage unit for storing user information; and
an access network selection unit for selecting a wireless communication access network based on the estimated available capacity and the user information.

13. The system of claim 12, wherein the access network selection unit provides a notification of the selected wireless communication access network to the mobile terminal.

14. The system of claim 8, wherein the quality of communication is based on at least one of a level of interference, an unused subcarrier rate, and a power level of a received signal.

15. A mobile terminal, comprising:
a correlation detection unit for calculating at least one correlation output based on signals transmitted by a base station and received by the mobile terminal;
an indicator calculation unit for calculating, using the at least one correlation output, an indication of the quality of communication between the base station and the mobile terminal; and
a communication unit for transmitting the indication of the quality of communication through the base station to an apparatus disposed outside of a core network of the base station, wherein:
the correlation detection unit is configured to calculate correlation outputs using a neighboring cell search, the neighboring cell search comprising:
detecting one of the correlation outputs between the received signal and a scrambling code assigned to the base station;
detecting a plurality of the correlation outputs between the received signal and corresponding ones of scrambling codes assigned to neighboring cells; and
identifying a maximum of the correlation outputs, the maximum correlation output being associated with a corresponding one of the scrambling codes; and
the indicator calculation unit is configured to:
determine a minimum of the correlation outputs; and
compute the indication as a ratio of the minimum correlation output to the maximum correlation output.

16. The mobile terminal of claim 15, wherein the computing comprises:
calculating an average value corresponding to a subset of the correlation outputs, the subset excluding the maximum correlation output; and
computing the indication as a ratio of the average value to the maximum correlation output.

17. The mobile terminal of claim 15, wherein a decrease in the ratio indicates an increase in the estimated available capacity of the base station.

18. The mobile terminal of claim 15, further comprising a GPS unit for acquiring location information indicating the current location of the mobile terminal, wherein the location information is transmitted to the base station.

19. The mobile terminal of claim 15, wherein the indication of the quality of communication is based on at least one of a level of interference, an unused subcarrier rate, and a power level of a received signal.

20. The mobile terminal of claim 15, wherein the indicator calculation unit is configured to calculate the indication for estimating the available capacity of the base station.

21. A method for estimating an available capacity of a base station within a wireless communication access network, the method comprising:
receiving correlation outputs, generated by a mobile terminal, that correspond to at least one of (i) a plurality of scrambling codes forming a specific scrambling code group or (ii) a plurality of scrambling codes assigned to neighboring cells;
calculating, using an apparatus disposed outside of a core network of the base station, an indication of the quality of communication between the base station and the mobile terminal, based on at least the received correlation outputs; and
estimating, using the apparatus, the available capacity of the base station based on the calculated indication of the quality of communication,
wherein the calculating comprises calculating the indication using a neighboring cell search, the neighboring cell search comprising:
detecting one of the correlation outputs between the received signal and a scrambling code assigned to the base station;
detecting a plurality of the correlation outputs between the received signal and corresponding ones of scrambling codes assigned to neighboring cells;
identifying a maximum of the detected correlation outputs, the maximum correlation output being associated with a corresponding one of the scrambling codes;
determining a minimum of the correlation outputs; and
computing the indication as a ratio of the minimum correlation output to the maximum correlation output.

22. The method of claim 21, wherein the correlation outputs comprise correlation values indicating a relationship between a first scrambling code having a maximum correlation output to a signal transmitted by the base station and received by the mobile terminal and a correlation output of a second scrambling code to the signal transmitted by the base station and received by the mobile terminal.

23. The method of claim 22, wherein the correlation output of the second scrambling code is equivalent to a value of the received signal divided by a spread factor.

24. The method of claim 21, further comprising:
receiving location information, generated by the mobile terminal, comprising the current location of the mobile terminal; and
adjusting the estimated available capacity of the base station based on the location information.

25. The method of claim 21, further comprising selecting, for the mobile terminal, a wireless communication access network based on the estimated available capacity and user selected preferences.

26. The method of claim 21, wherein the quality of communication is based on at least one of a level of interference, an unused subcarrier rate, and a power level of a received signal.

27. A tangible, non-transitory computer-readable medium including program instructions for performing, when executed by a processor, a method comprising:
 calculating correlation outputs based on signals transmitted by a base station and received by a mobile terminal;
 calculating, using at least one of the correlation outputs, an indication of the quality of communication between the base station and the mobile terminal; and
 transmitting the indication of the quality of communication through the base station to an apparatus disposed outside of the core network of the base station,
 wherein the calculating comprises calculating the indication using a neighboring cell search, the neighboring cell search comprising:
  detecting one of the correlation outputs between the received signal and a scrambling code assigned to the base station;
  detecting a plurality of the correlation outputs between the received signal and corresponding ones of scrambling codes assigned to neighboring cells;
  identifying a maximum of the detected correlation outputs, the maximum correlation output being associated with a corresponding one of the scrambling codes;
  determining a minimum of the correlation outputs; and
  calculating the indication as a ratio of the minimum correlation output to the maximum correlation output.

* * * * *